(12) United States Patent  
Edwards et al.

(10) Patent No.: US 12,215,656 B2  
(45) Date of Patent: Feb. 4, 2025

(54) EVAPORATIVE EMISSIONS CONTROL FOR A VEHICLE

(71) Applicant: Polaris Industries Inc., Medina, MN (US)

(72) Inventors: Lindsay S B Edwards, North Branch, MN (US); Jonathon P. Graus, Wyoming, MN (US); Nick Levin, Wyoming, MN (US)

(73) Assignee: Polaris Industries Inc., Medina, MN (US)

(*) Notice: Subject to any disclaimer, the term of this patent is extended or adjusted under 35 U.S.C. 154(b) by 25 days.

(21) Appl. No.: 18/101,743

(22) Filed: Jan. 26, 2023

(65) Prior Publication Data

US 2023/0175462 A1    Jun. 8, 2023

Related U.S. Application Data

(60) Continuation of application No. 16/999,833, filed on Aug. 21, 2020, now Pat. No. 11,585,300, which is a (Continued)

(51) Int. Cl.
*F02M 25/08* (2006.01)
*B60K 5/04* (2006.01)
(Continued)

(52) U.S. Cl.
CPC ............. *F02M 25/089* (2013.01); *B60K 5/04* (2013.01); *B60K 15/03504* (2013.01);
(Continued)

(58) Field of Classification Search
CPC ............. F02M 25/089; F02M 25/0836; F02M 25/0854; F02M 25/0872; F02M 25/08;
(Continued)

(56) References Cited

U.S. PATENT DOCUMENTS 3,646,731 A    3/1972   Hansen
3,709,202 A    1/1973   Brown
(Continued)

FOREIGN PATENT DOCUMENTS

AU    2010200133 A1    9/2010
CA         1270160 A    6/1990
(Continued)

OTHER PUBLICATIONS

International Preliminary Report on Patentability issued by The International Bureau of WIPO, dated Jun. 25, 2019, for International Patent Application No. PCT/US2017/065531; 10 pages.
(Continued)

*Primary Examiner* — Hau V Phan
(74) *Attorney, Agent, or Firm* — Faegre Drinker Biddle & Reath LLP

(57) ABSTRACT

A fuel system comprising a fuel tank, a mixing volume configured to mix fuel vapor and air, the mixing volume comprising an outlet configured to be fluidly coupled to an engine, and a fuel vapor line configured to fluidly couple the fuel tank to the mixing volume.

21 Claims, 19 Drawing Sheets

Related U.S. Application Data division of application No. 15/387,662, filed on Dec. 22, 2016, now Pat. No. 10,767,600.

(51) Int. Cl.
*B60K 15/035* (2006.01)
*F02B 75/18* (2006.01)
*F02D 41/00* (2006.01)

(52) U.S. Cl.
CPC ........ *B60K 15/03519* (2013.01); *F02B 75/18* (2013.01); *F02D 41/004* (2013.01); *F02M 25/0836* (2013.01); *F02M 25/0854* (2013.01); *F02M 25/0872* (2013.01); *B60K 2015/0358* (2013.01); *B60Y 2200/20* (2013.01); *F02B 2075/1808* (2013.01)

(58) Field of Classification Search
CPC ................ B60K 15/03504; B60K 5/04; B60K 15/03519; F02D 41/004
USPC ........................................................ 180/69.4
See application file for complete search history.

(56) References Cited

U.S. PATENT DOCUMENTS

| | | |
|---|---|---|
| 4,173,207 A | 11/1979 | Hiramatsu |
| 4,308,842 A | 1/1982 | Watanabe et al. |
| 4,381,753 A | 5/1983 | Yuzawa et al. |
| 4,450,820 A | 5/1984 | Haynes |
| 4,727,955 A | 3/1988 | Honda et al. |
| 4,809,666 A | 3/1989 | Baltz |
| 4,853,009 A | 8/1989 | Turner et al. |
| 4,915,188 A | 4/1990 | Ota et al. |
| 4,951,637 A | 8/1990 | Cook |
| 5,058,693 A | 10/1991 | Murdock et al. |
| 5,450,833 A | 9/1995 | Denz et al. |
| 5,477,836 A | 12/1995 | Hyodo et al. |
| 5,522,368 A | 6/1996 | Tusino |
| 5,647,333 A | 7/1997 | Mukai |
| 5,653,103 A | 8/1997 | Katoh |
| 5,655,500 A | 8/1997 | Kato |
| 5,655,505 A | 8/1997 | Tusino |
| 5,702,125 A | 12/1997 | Nakajima et al. |
| 5,806,500 A | 9/1998 | Fargo et al. |
| 5,817,925 A | 10/1998 | Cook et al. |
| 5,906,189 A | 5/1999 | Mukai et al. |
| 5,924,409 A | 7/1999 | Kato |
| 5,988,145 A | 11/1999 | Horiuchi et al. |
| 6,098,894 A | 8/2000 | Ohta et al. |
| 6,105,708 A | 8/2000 | Amano et al. |
| 6,176,206 B1 | 1/2001 | Ishikawa et al. |
| 6,182,693 B1 | 2/2001 | Stack et al. |
| 6,202,988 B1 | 3/2001 | Abe et al. |
| 6,217,008 B1 | 4/2001 | Abe et al. |
| 6,308,987 B1 | 10/2001 | Mitake |
| 6,363,920 B1 | 4/2002 | Parker et al. |
| RE37,895 E | 10/2002 | Kuroda et al. |
| 6,460,517 B1 | 10/2002 | Dauer |
| 6,516,756 B1 | 2/2003 | Kato et al. |
| 6,557,533 B2 | 5/2003 | Katayama et al. |
| 6,675,641 B2 | 1/2004 | Gehner et al. |
| 6,851,458 B2 | 2/2005 | Nakajima et al. |
| 6,871,662 B2 | 3/2005 | Duermeier et al. |
| 6,893,047 B2 | 5/2005 | Chou et al. |
| 6,951,209 B2 | 10/2005 | Yanase et al. |
| 7,008,470 B2 | 3/2006 | Makino et al. |
| 7,086,389 B2 | 8/2006 | Yamada |
| 7,104,258 B2 | 9/2006 | Yamada et al. |
| 7,237,644 B2 | 7/2007 | Matsumoto et al. |
| 7,261,092 B1 | 8/2007 | Oku et al. |
| 7,322,343 B2 | 1/2008 | Yamada et al. |
| 7,373,930 B1 | 5/2008 | Hadre |
| 7,380,543 B2 | 6/2008 | Hatano et al. |
| 7,438,058 B2 | 10/2008 | Ito et al. |
| 7,507,278 B2 | 3/2009 | Makino et al. |
| 7,540,276 B2 | 6/2009 | Makino |
| 7,614,387 B2 | 11/2009 | Wang et al. |
| 7,665,428 B2 | 2/2010 | Dearth et al. |
| 7,753,034 B2 | 7/2010 | Hoke et al. |
| 7,810,842 B2 | 10/2010 | Ichikawa |
| 7,841,624 B2 | 11/2010 | Kobayashi et al. |
| 7,845,315 B2 | 12/2010 | Leone et al. |
| 7,998,257 B2 | 8/2011 | Makino et al. |
| 8,034,504 B2 | 10/2011 | Tsunoda et al. |
| 8,087,486 B2 | 1/2012 | Yamamuro |
| 8,113,312 B2 | 2/2012 | Seki et al. |
| 8,118,009 B2 | 2/2012 | Pursifull et al. |
| 8,118,128 B2 | 2/2012 | Shimura et al. |
| 8,141,356 B2 | 3/2012 | Leone et al. |
| 8,141,672 B2 | 3/2012 | Kuramochi et al. |
| 8,156,924 B2 | 4/2012 | Hudak et al. |
| 8,206,470 B1 | 6/2012 | Jacobson |
| 8,214,130 B2 | 7/2012 | Andri |
| 8,215,677 B2 | 7/2012 | Hosoya et al. |
| 8,251,048 B2 | 8/2012 | Kusa |
| 8,256,557 B2 | 9/2012 | Suzuki |
| 8,267,074 B2 | 9/2012 | Leone et al. |
| 8,276,702 B2 | 10/2012 | Inaoka |
| 8,276,944 B2 | 10/2012 | Inaoka |
| 8,302,632 B2 | 11/2012 | Miura et al. |
| 8,316,979 B2 | 11/2012 | Seki |
| 8,342,282 B2 | 1/2013 | Kuramochi et al. |
| 8,342,358 B2 | 1/2013 | Kobayashi et al. |
| 8,343,263 B2 | 1/2013 | Murayama et al. |
| 8,381,855 B2 | 2/2013 | Suzuki et al. |
| 8,418,794 B2 | 4/2013 | Shibata et al. |
| 8,434,431 B2 | 5/2013 | Fried et al. |
| 8,443,786 B2 | 5/2013 | Yamasaki |
| 8,448,629 B2 | 5/2013 | Makino et al. |
| 8,448,734 B2 | 5/2013 | Maeda et al. |
| 8,448,737 B2 | 5/2013 | Hasegawa |
| 8,490,733 B2 | 7/2013 | Kitta |
| 8,512,453 B2 | 8/2013 | Rudolph et al. |
| 8,550,058 B2 | 10/2013 | Pursifull et al. |
| 8,560,167 B2 | 10/2013 | Jentz et al. |
| 8,561,745 B2 | 10/2013 | Inaoka et al. |
| 8,573,183 B2 | 11/2013 | Graham et al. |
| 8,725,347 B2 | 5/2014 | Jentz et al. |
| 8,726,888 B2 | 5/2014 | Yoshida et al. |
| 8,752,661 B2 | 6/2014 | Nagura et al. |
| 8,851,523 B2 | 10/2014 | Shiina et al. |
| 8,864,877 B2 | 10/2014 | Nishita et al. |
| 8,899,367 B2 | 12/2014 | Hayashi et al. |
| 8,905,005 B2 | 12/2014 | Shimura et al. |
| 8,924,133 B2 | 12/2014 | Hadre et al. |
| 8,931,459 B2 | 1/2015 | Sotiriades |
| 8,960,163 B2 | 2/2015 | Iwaya et al. |
| 8,992,673 B2 | 3/2015 | Mani |
| 9,022,008 B2 | 5/2015 | Hirukawa |
| 9,133,797 B2 | 9/2015 | Shomura et al. |
| 9,199,684 B2 | 12/2015 | Hara |
| 10,300,786 B2 * | 5/2019 | Nugteren ............... B60K 13/02 |
| 10,767,600 B2 | 9/2020 | Oakden-Graus et al. |
| 11,585,300 B2 * | 2/2023 | Graus ..................... F02B 75/18 |
| 2001/0047723 A1 | 12/2001 | Miura et al. |
| 2004/0200356 A1 | 10/2004 | Kuperus |
| 2005/0211496 A1 | 9/2005 | Ito et al. |
| 2005/0241480 A1 | 11/2005 | Lebowitz et al. |
| 2006/0065253 A1 | 3/2006 | Reddy |
| 2007/0266997 A1 | 11/2007 | Clontz et al. |
| 2008/0041226 A1 | 2/2008 | Hiltzik et al. |
| 2008/0149075 A1 | 6/2008 | Toyoda et al. |
| 2009/0013973 A1 | 1/2009 | Yamasaki |
| 2011/0168025 A1 | 7/2011 | Huynh |
| 2011/0297127 A1 | 12/2011 | Aso |
| 2012/0152407 A1 | 6/2012 | Monterrey |
| 2012/0222657 A1 | 9/2012 | Sano et al. |
| 2013/0033070 A1 | 2/2013 | Kinsman et al. |
| 2013/0048890 A1 | 2/2013 | Miura |
| 2013/0104858 A1 | 5/2013 | Iwaya et al. |
| 2013/0247881 A1 | 9/2013 | Okubo et al. |
| 2013/0298879 A1 * | 11/2013 | Pearce ............... F02D 41/0032 |
| | | 123/519 |

(56) References Cited

U.S. PATENT DOCUMENTS

| | | | |
|---|---|---|---|
| 2014/0005912 A1 | 1/2014 | Ide et al. | |
| 2014/0060955 A1 | 3/2014 | Kono | |
| 2014/0123961 A1* | 5/2014 | Kragh | F02M 25/0809 123/519 |
| 2015/0047917 A1* | 2/2015 | Burt, II | B60K 5/00 180/68.5 |
| 2015/0114370 A1 | 4/2015 | Leone et al. | |
| 2015/0184621 A1 | 7/2015 | Arase et al. | |
| 2016/0083244 A1 | 3/2016 | Ogiwara et al. | |
| 2016/0229476 A1 | 8/2016 | Yasuta et al. | |
| 2016/0265480 A1 | 9/2016 | Fukui et al. | |
| 2017/0145963 A1* | 5/2017 | Dudar | B60K 15/03504 |
| 2018/0179991 A1 | 6/2018 | Oakden-Graus et al. | |
| 2020/0378344 A1 | 12/2020 | Graus et al. | |

FOREIGN PATENT DOCUMENTS

| | | |
|---|---|---|
| CA | 2736158 A1 | 3/2010 |
| CN | 104743015 A | 7/2015 |
| DE | 102005053809 A1 | 5/2007 |
| EP | 2063098 A1 | 5/2009 |
| EP | 2071172 A1 | 6/2009 |
| EP | 2143584 A1 | 1/2010 |
| EP | 2264305 A1 | 12/2010 |
| EP | 2326824 | 6/2011 |
| EP | 2769902 A1 | 8/2014 |
| IN | 201003277 | 11/2011 |
| IN | 201101885 | 12/2011 |
| IN | 201500396 | 7/2016 |
| IN | 201501944 | 10/2016 |
| JP | 62-087658 | 4/1987 |
| JP | 06-249086 A | 9/1994 |
| JP | 07-151022 A | 6/1995 |
| JP | 2998307 B2 | 1/2000 |
| JP | 2000-345929 A | 12/2000 |
| JP | 2001-342921 A | 12/2001 |
| JP | 2002-013445 A | 1/2002 |
| JP | 2002-093438 A | 3/2002 |
| JP | 2002-266709 A | 9/2002 |
| JP | 3336912 B2 | 10/2002 |
| JP | 3343569 B2 | 11/2002 |
| JP | 2003-080960 A | 3/2003 |
| JP | 3391202 B2 | 3/2003 |
| JP | 2003-237390 A | 8/2003 |
| JP | 2003-301747 A | 10/2003 |
| JP | 2004-293296 A | 10/2004 |
| JP | 3654397 B2 | 6/2005 |
| JP | 3666645 B2 | 6/2005 |
| JP | 3705398 B2 | 10/2005 |
| JP | 2006-070785 A | 3/2006 |
| JP | 2007-146793 A | 6/2007 |
| JP | 2007-196967 A | 8/2007 |
| JP | 2008-248795 A | 10/2008 |
| JP | 2009-002267 A | 1/2009 |
| JP | 2009-137583 A | 6/2009 |
| JP | 2009-215901 A | 9/2009 |
| JP | 4355312 B2 | 10/2009 |
| JP | 4446619 B2 | 4/2010 |
| JP | 2010-155506 A | 7/2010 |
| JP | 2012-132402 A | 7/2012 |
| JP | 5154506 B2 | 2/2013 |
| JP | 2013-067270 A | 4/2013 |
| JP | 2013-067272 A | 4/2013 |
| JP | 2013-067277 A | 4/2013 |
| JP | 2013-067296 A | 4/2013 |
| JP | 2013-189200 A | 9/2013 |
| JP | 5310053 B2 | 10/2013 |
| JP | 5461564 | 4/2014 |
| JP | 5481254 B2 | 4/2014 |
| JP | 5721599 B2 | 5/2015 |
| JP | 5908012 B2 | 4/2016 |
| JP | 5970491 B2 | 8/2016 |
| JP | 6002707 B2 | 10/2016 |
| JP | 6019053 B2 | 11/2016 |
| JP | 6019569 B2 | 11/2016 |
| KR | 10-1291025 B1 | 7/2013 |
| TH | 61921 | 5/2004 |
| VN | 10011772 | 10/2013 |
| VN | 10012473 | 4/2014 |
| VN | 42800 | 7/2015 |
| VN | 44858 | 12/2015 |
| WO | 2008/027935 A1 | 3/2008 |
| WO | 2008/027938 A1 | 3/2008 |
| WO | 2009/098806 A1 | 8/2009 |
| WO | 2010/032065 A1 | 3/2010 |
| WO | 2013/094549 A1 | 6/2013 |
| WO | 2013/094631 A1 | 6/2013 |
| WO | 2014/112959 A1 | 7/2014 |
| WO | 2014/158102 A1 | 10/2014 |
| WO | 2014/158103 A1 | 10/2014 |
| WO | 2015/048492 A1 | 4/2015 |
| WO | 2015/199106 A1 | 12/2015 |
| WO | 2016/021245 A1 | 2/2016 |
| WO | 2016/021246 A1 | 2/2016 |
| WO | 2016/021247 A1 | 2/2016 |
| WO | 2016/156893 A1 | 10/2016 |

OTHER PUBLICATIONS

International Search Report of the International Searching Authority, dated May 29, 2018, for related International Patent Application No. PCT/US2017/065531; 6 pages.

Written Opinion of the International Searching Authority, dated May 29, 2018, for related International Patent Application No. PCT/US2017/065531; 9 pages.

\* cited by examiner

EVAPORATIVE EMISSIONS CONTROL FOR A VEHICLE

CROSS-REFERENCE TO RELATED APPLICATIONS

This application is a continuation of U.S. patent application Ser. No. 16/999,833, filed Aug. 21, 2020, titled EVAPORATIVE EMISSIONS CONTROL FOR A VEHICLE, which is a divisional of U.S. patent application Ser. No. 15/387,662, filed Dec. 22, 2016, issued as U.S. Pat. No. 10,767,600 on Sep. 8, 2020, titled EVAPORATIVE EMISSIONS CONTROL FOR A VEHICLE, the entire disclosure of which is expressly incorporated herein by reference.

BACKGROUND OF THE PRESENT DISCLOSURE

The present disclosure generally relates to a fuel system of a vehicle, and more particularly, to a fuel system comprising components configured to reduce evaporative emissions.

All vehicles, including all-terrain vehicles ("ATVs") and utility vehicles ("UVs"), are required to meet specific emission standards under rules and regulation of federal and state governments. Over time, emission standards have been and are becoming more regulated in an effort to reduce overall emissions emitted from all types of vehicles.

In some vehicles, fuel systems may be the primary source of evaporative emissions of a vehicle. As a result, there is a need for an improved fuel system to further reduce the evaporative emissions from a vehicle in order to meet ever-changing emission standards.

SUMMARY OF THE PRESENT DISCLOSURE

In one embodiment of the present disclosure, a fuel system comprises a fuel tank, a mixing volume configured to mix fuel vapor and air, and a fuel vapor line configured to fluidly couple the fuel tank to the mixing volume, wherein the mixing volume comprises an outlet configured to be fluidly coupled to an engine.

In one aspect of the fuel system, the mixing volume is fluidly coupled to at least one throttle body of the engine.

In a further aspect of the fuel system, the mixing volume is fluidly coupled to the at least one throttle body upstream of an outlet of the at least one throttle body of the engine.

In another aspect of the fuel system, the fuel system is positioned within a utility vehicle comprising an open-air operator area generally surrounded by an upper frame assembly extending to a position above seating positioned within the open-air operator area.

In another aspect of the fuel system, the fuel system further comprises a purge valve positioned along the fuel vapor line between the fuel tank and the mixing volume, and the purge valve is configured to provide fuel vapor to the mixing volume.

In a further aspect of the fuel system, the purge valve is actuated at predetermined, uniform time intervals.

In another aspect of the fuel system, the purge valve is actuated based on at least one of an engine speed, an engine intake temperature, an engine load, a throttle position, a coolant temperature, a time period at idle, a concentration of fuel vapor within the fuel vapor line, or an amount of fuel vapor purged at a time following ignition of the engine.

In a further aspect of the fuel system, the mixing volume is less than approximately 300 millimeters from the engine.

In another aspect of the fuel system, the mixing volume further comprises an inlet and a baffle, and the inlet is configured to receive the fuel vapor and air and the baffle is positioned between the inlet and the outlet.

In a further aspect of the fuel system, the inlet and the outlet are positioned on a first side surface of the mixing volume, and the mixing volume is configured to flow the mixed fuel vapor and air in an arcuate flow path between the inlet and the outlet.

In another aspect of the fuel system, the mixing volume is positioned vertically higher than a cylinder head of the engine.

In a further aspect of the fuel system, the mixing volume is laterally spaced apart from the cylinder head of the engine.

In another embodiment of the present disclosure, a vehicle comprises a frame, a plurality of ground engaging members supporting the frame, a powertrain assembly operably coupled to the ground engaging members, and a fuel system fluidly coupled to the engine. The powertrain assembly of the vehicle comprises an engine having a first cylinder and a second cylinder, and at least one throttle body fluidly coupled to the first cylinder and the second cylinder. The fuel system of the vehicle comprises a fuel tank, a first check valve operably coupled to the first cylinder, a second check valve operably coupled to the second cylinder, and a fuel vapor line fluidly coupling the fuel tank to the first check valve and the second check valve.

In one aspect of the vehicle, the first and second check valves are positioned within approximately 150 millimeters of the first and second cylinders.

In another aspect of the vehicle, the fuel system further includes a purge valve and a mixing volume. The purge valve is positioned downstream of the fuel tank and upstream of the mixing volume and the mixing volume is positioned downstream of the fuel tank and the purge valve and upstream of the first and second check valves.

In a further aspect of the vehicle, the first and second check valves inhibit fluid communication between the first cylinder and the second cylinder.

In another embodiment of the present disclosure, a vehicle comprises a frame, a plurality of ground engaging members supporting the frame, an operator area including at least one seat supported by the frame, a powertrain assembly operably coupled to the ground engaging members, and a fuel system fluidly coupled to the engine. The powertrain assembly of the vehicle comprises an engine positioned generally rearward of the at least one seat. The fuel system of the vehicle includes a fuel tank positioned below the at least one seat, a mixing volume, and a purge valve positioned along the fuel vapor line, and the mixing volume and the purge valve are positioned rearward of the at least one seat.

In one aspect of the vehicle, the fuel system further includes an evaporation canister positioned under the fuel tank.

In another aspect of the vehicle, the at least one seat includes a first seat and a second seat in side-by-side arrangement with the first seat, and the fuel system further includes an evaporation canister positioned under the second seat and the fuel tank is positioned under the first seat.

In a further aspect of the vehicle, the mixing volume is positioned vertically higher than an uppermost surface of the engine.

The above mentioned and other features of the invention, and the manner of attaining them, will become more apparent and the invention itself will be better understood by reference to the following description of embodiments of the invention taken in conjunction with the accompanying drawings.

DETAILED DESCRIPTION OF THE DRAWINGS

Figure 1:
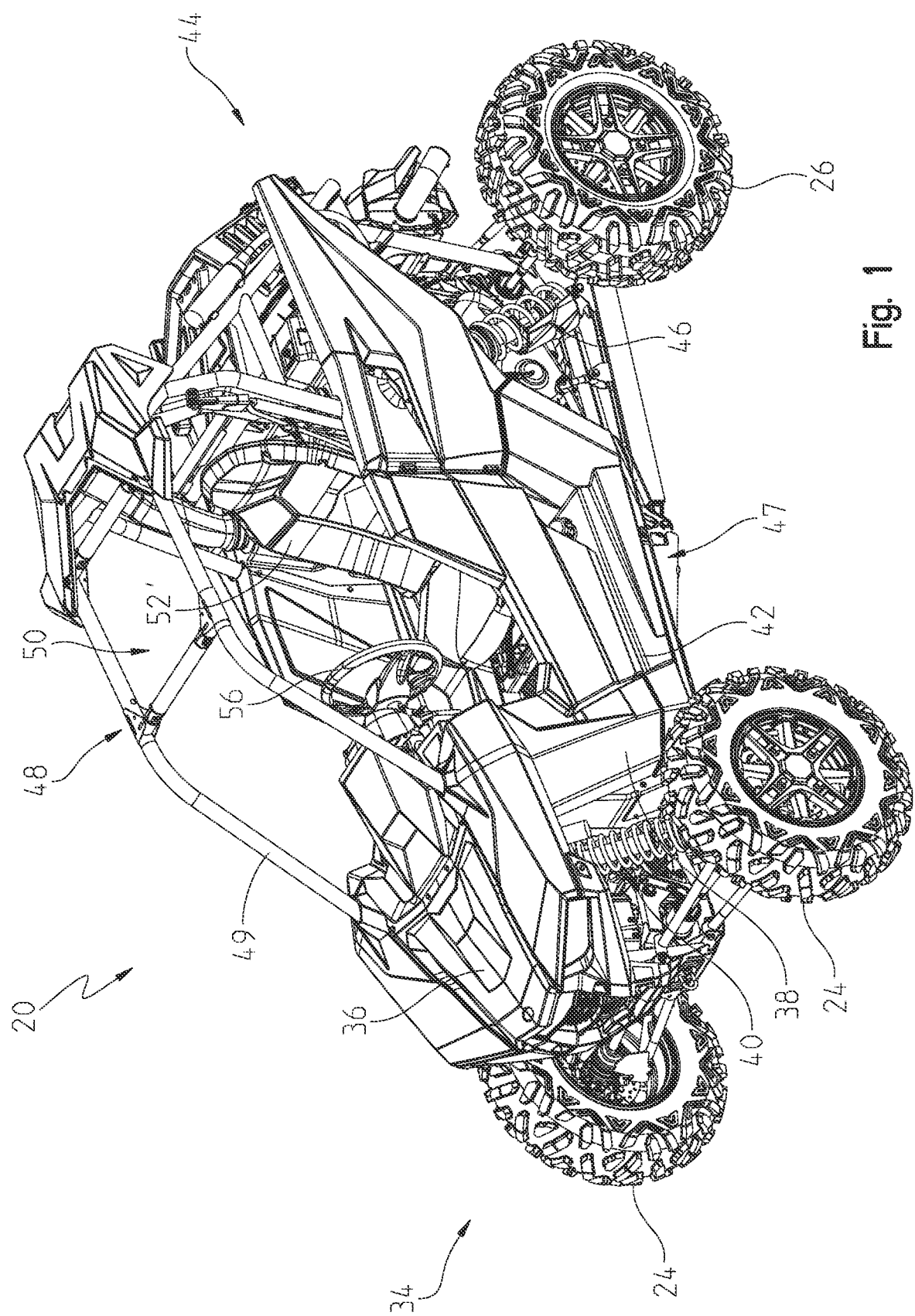
FIG. 1 shows a left front perspective view of an embodiment of a vehicle of the present disclosure.

Corresponding reference characters indicate corresponding parts throughout the several views. Unless stated otherwise the drawings are proportional.

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, watercraft, snowmobiles, people movers, and golf carts.

Figure 11:
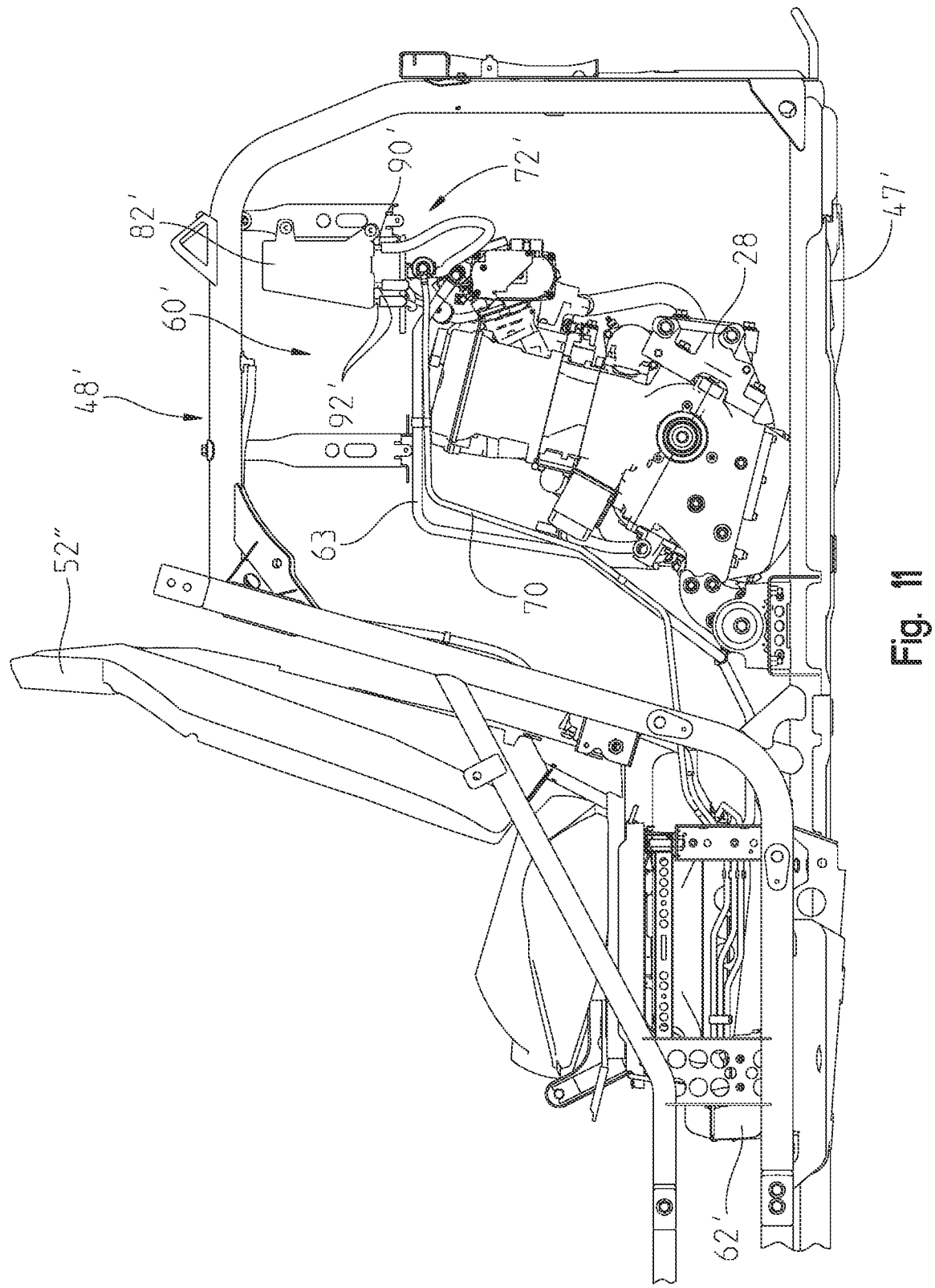
FIG. 11 shows a left side view of an engine, a fuel system, a portion of a frame, and a first seat of the vehicle of FIG. 9.
Figure 15:
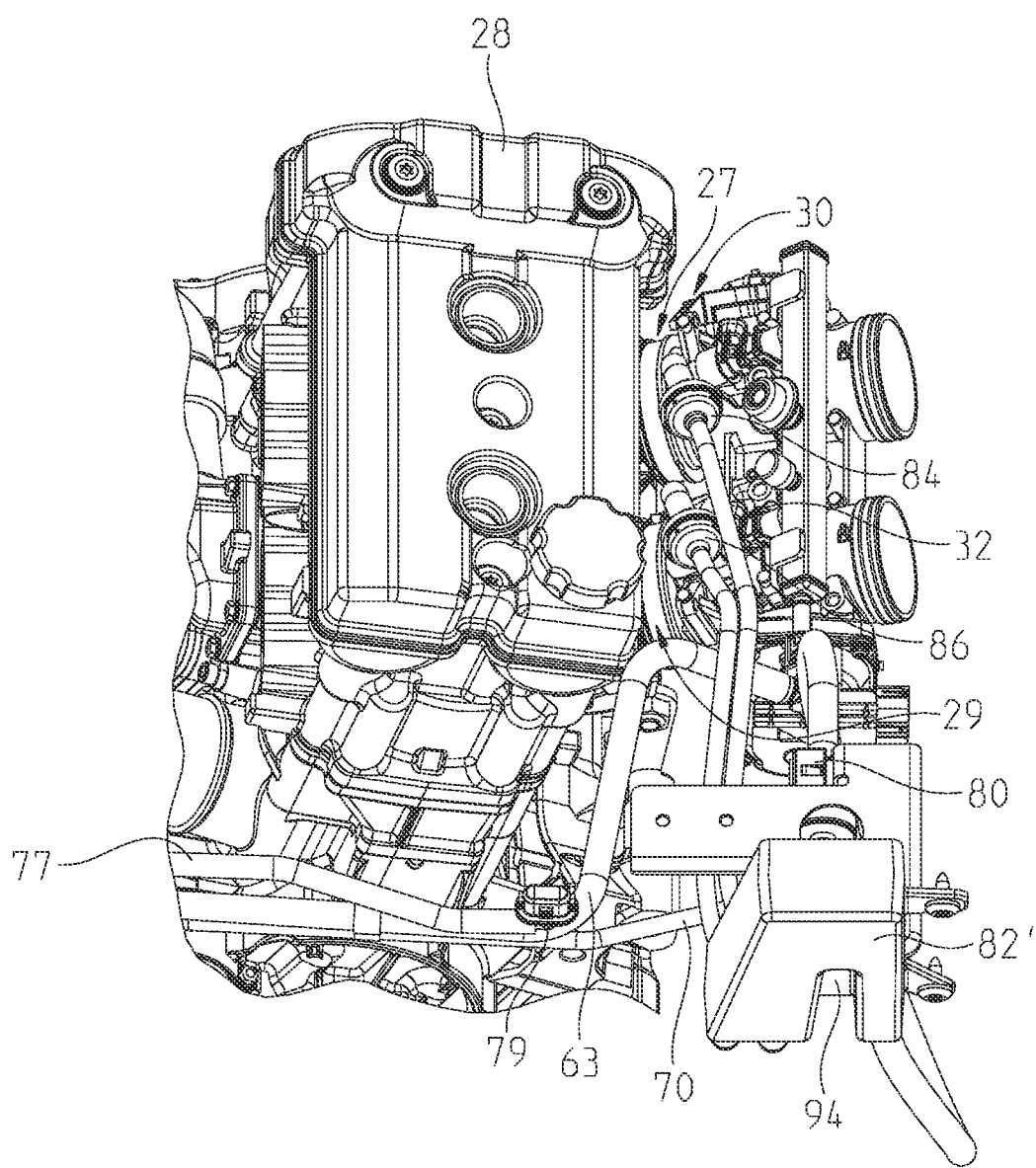
FIG. 15 shows a top perspective view of a portion of the engine and a portion of the fuel system of FIG. 11.
Figure 16:
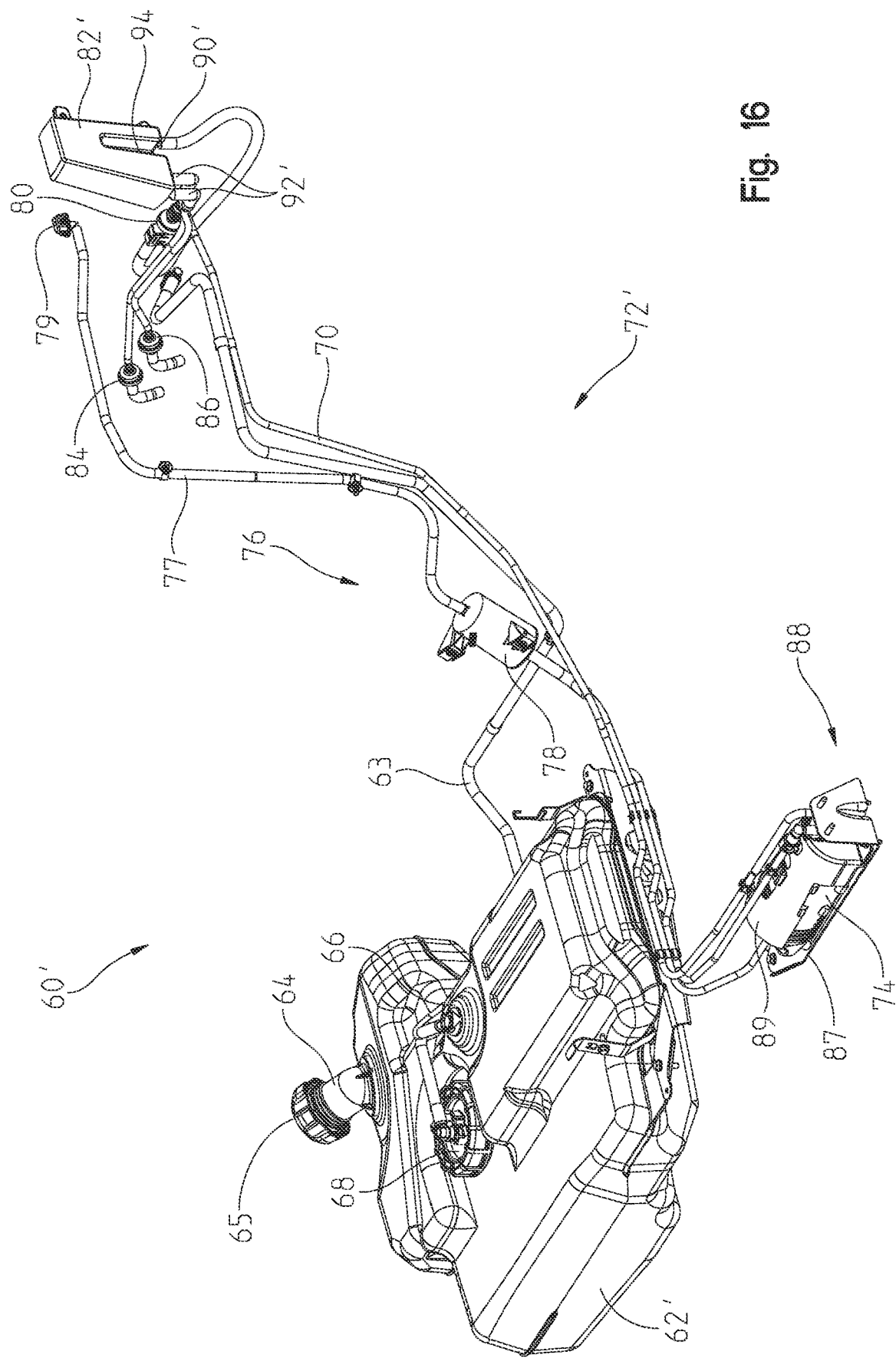
FIG. 16 shows a left front perspective view of the fuel system of FIG. 11.
Figure 17:
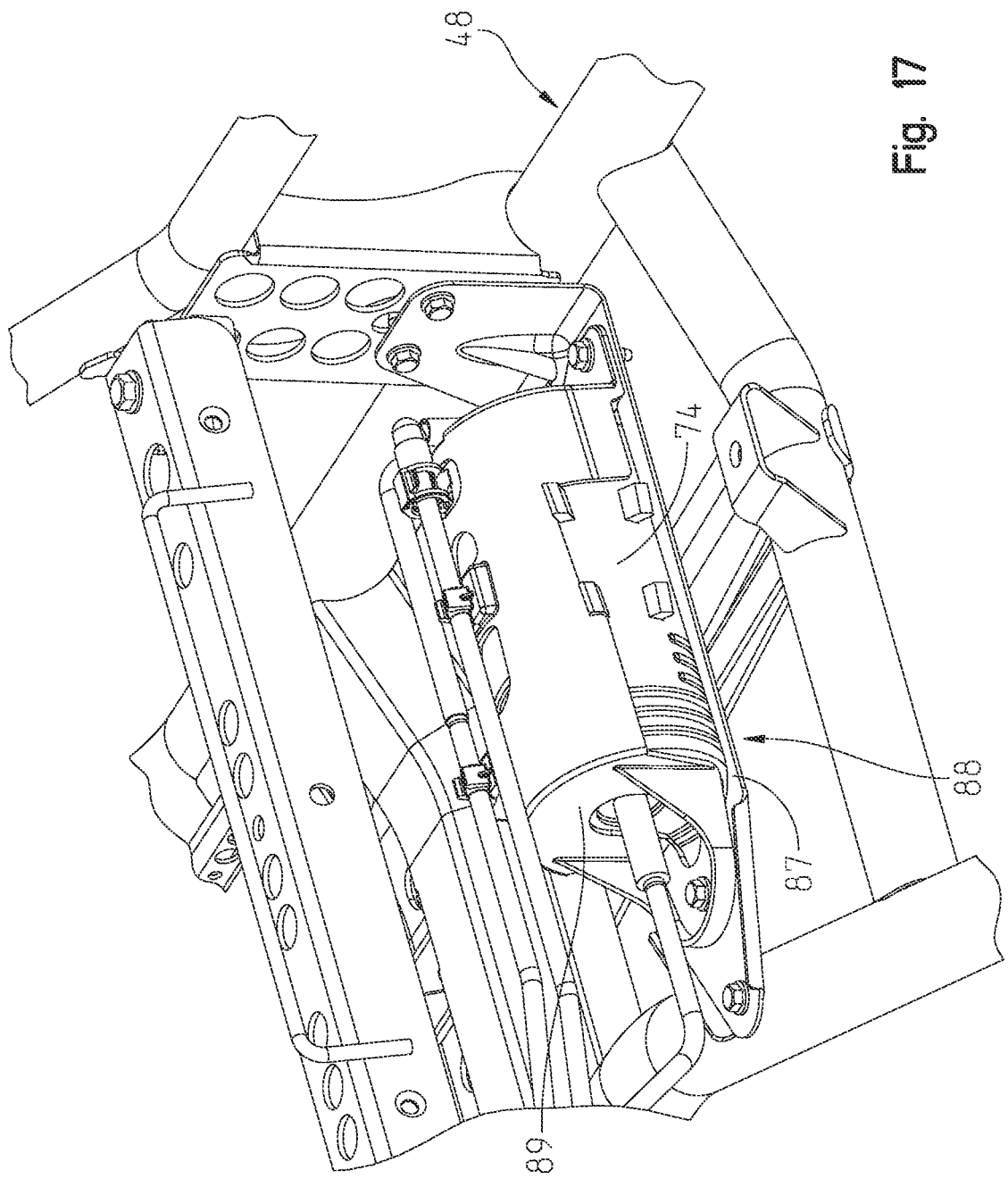
FIG. 17 shows a right front perspective view of a canister and a canister bracket of the fuel system of FIG. 11 coupled to the portion of the frame of FIG. 11.
Figure 18:
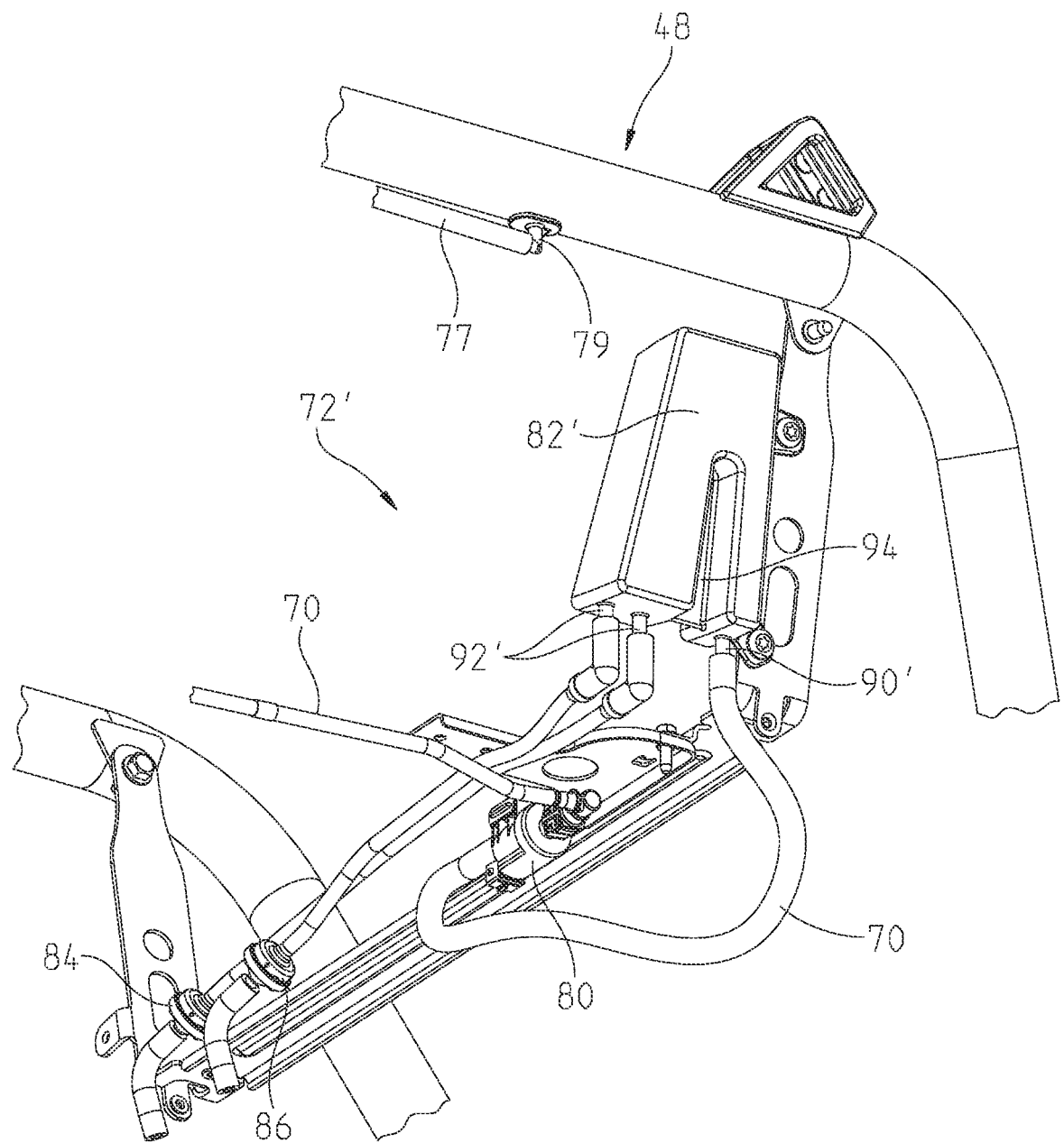
FIG. 18 shows a left side perspective view of a purge valve, a mixing volume, a plurality of check valves, and a plurality of coupling lines of the fuel system of FIG. 11 coupled to the portion of the frame of FIG. 11.

With reference to FIGS. 1, 2, 9, and 10, a utility vehicle 20, 20' is configured to be supported on a ground surface with front ground-engaging members, illustratively front wheels 24, and rear ground-engaging members, illustratively rear wheels 26. Front and rear wheels 24, 26 are operably coupled to a brake assembly (not shown). Additionally, front and rear wheels 24, 26 are operably coupled to a powertrain assembly. The powertrain assembly may include an engine 28 (FIGS. 3 and 11), a first throttle body 30, a second throttle body 32 (FIGS. 7 and 15), a transmission, for example a continuously variable transmission ("CVT"), a driveshaft, a front differential, and a rear differential. The powertrain assembly draws air from an intake assembly, and is operably coupled to an exhaust assembly (not shown).

As shown in FIGS. 1, 2, 9, and 10, front wheels 24 support a front end 34 of utility vehicle 20, 20' which includes at least a hood 36, a plurality of outer body panels 38, and a front suspension assembly 40. Rear wheels 26 support a rear end 44 of utility vehicle 20, 20', which includes at least the powertrain assembly, the intake assembly, the exhaust assembly, and a rear suspension assembly 46. In various embodiments, vehicle 20, 20' may also include at least one door 42 positioned between front end 34 and rear end 44.

Figure 9:
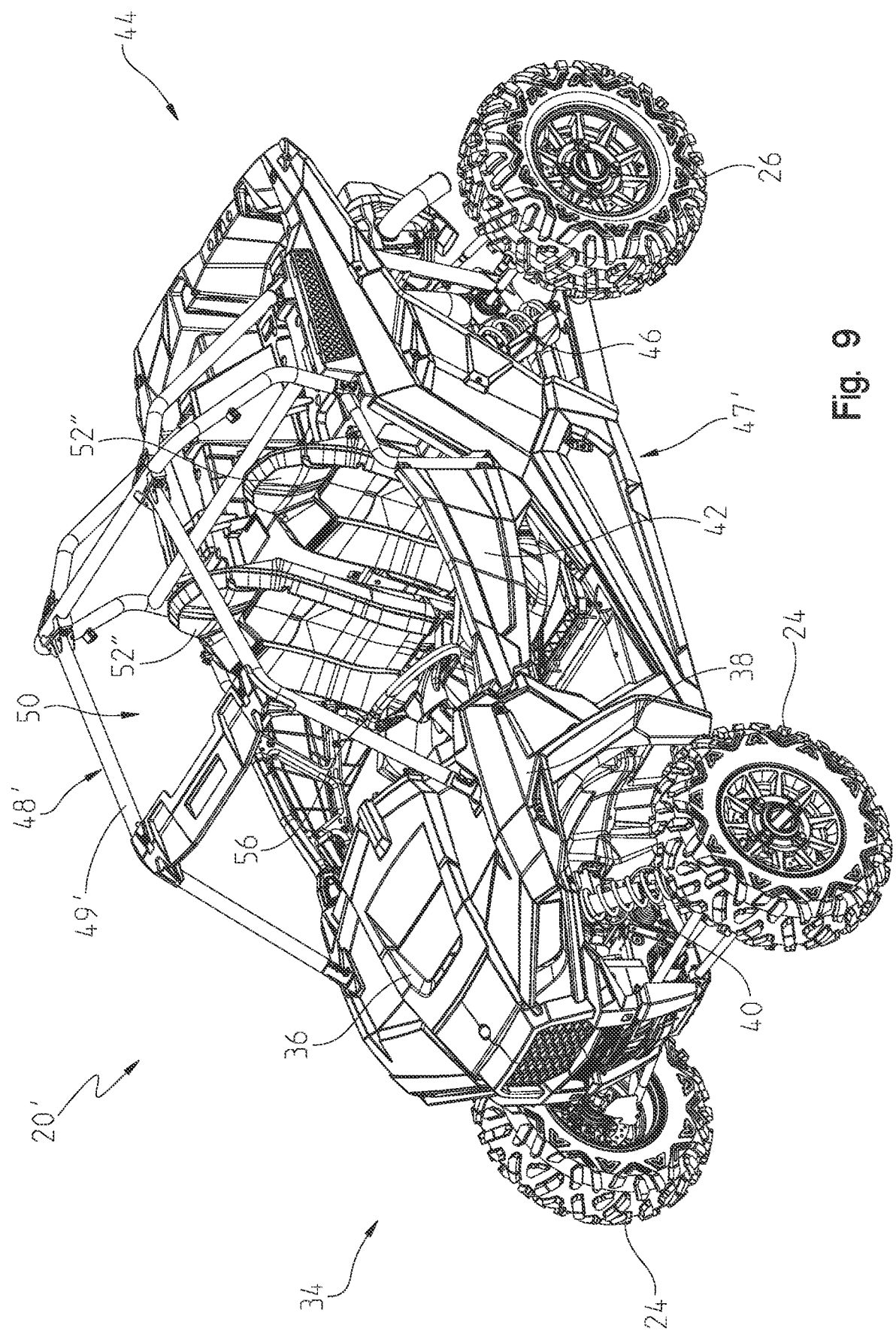
FIG. 9 shows a left front perspective view of another embodiment of a vehicle of the present disclosure.
Figure 10:
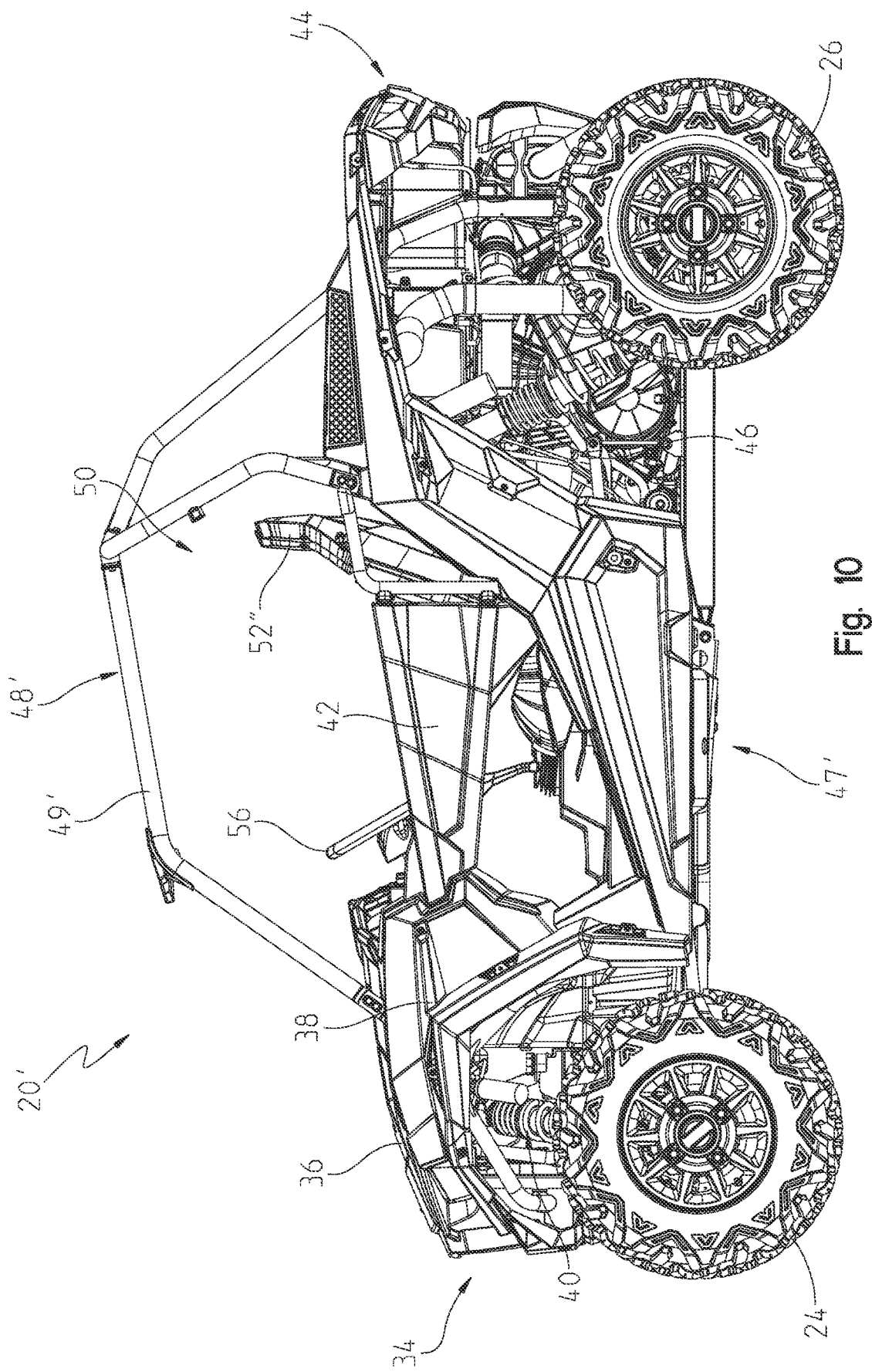
FIG. 10 shows a left side view of the vehicle of FIG. 9.
Figure 12:
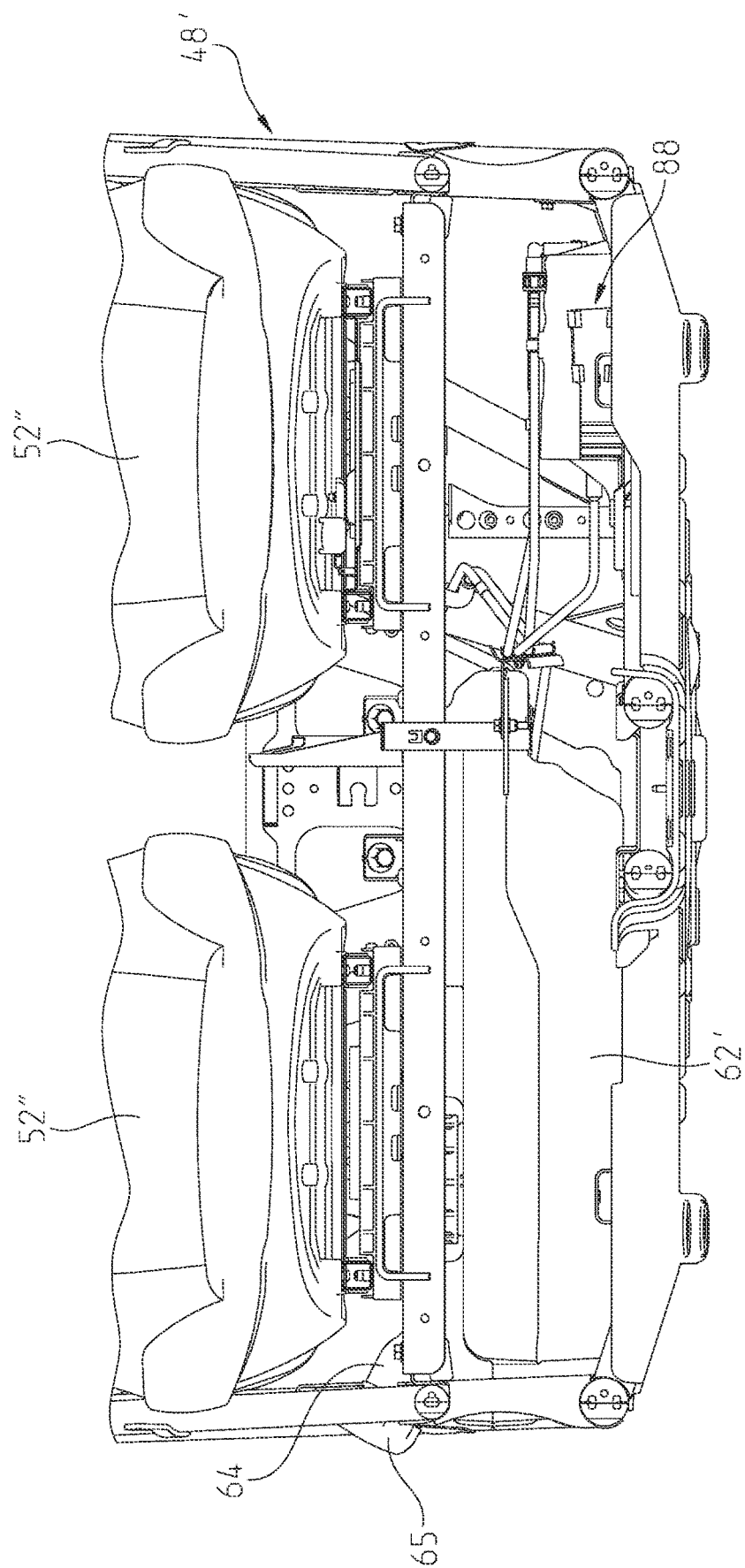
FIG. 12 shows a front view of the first seat, a second seat, the portion of the frame, and the fuel system of the vehicle of FIG. 9.
Figure 13:
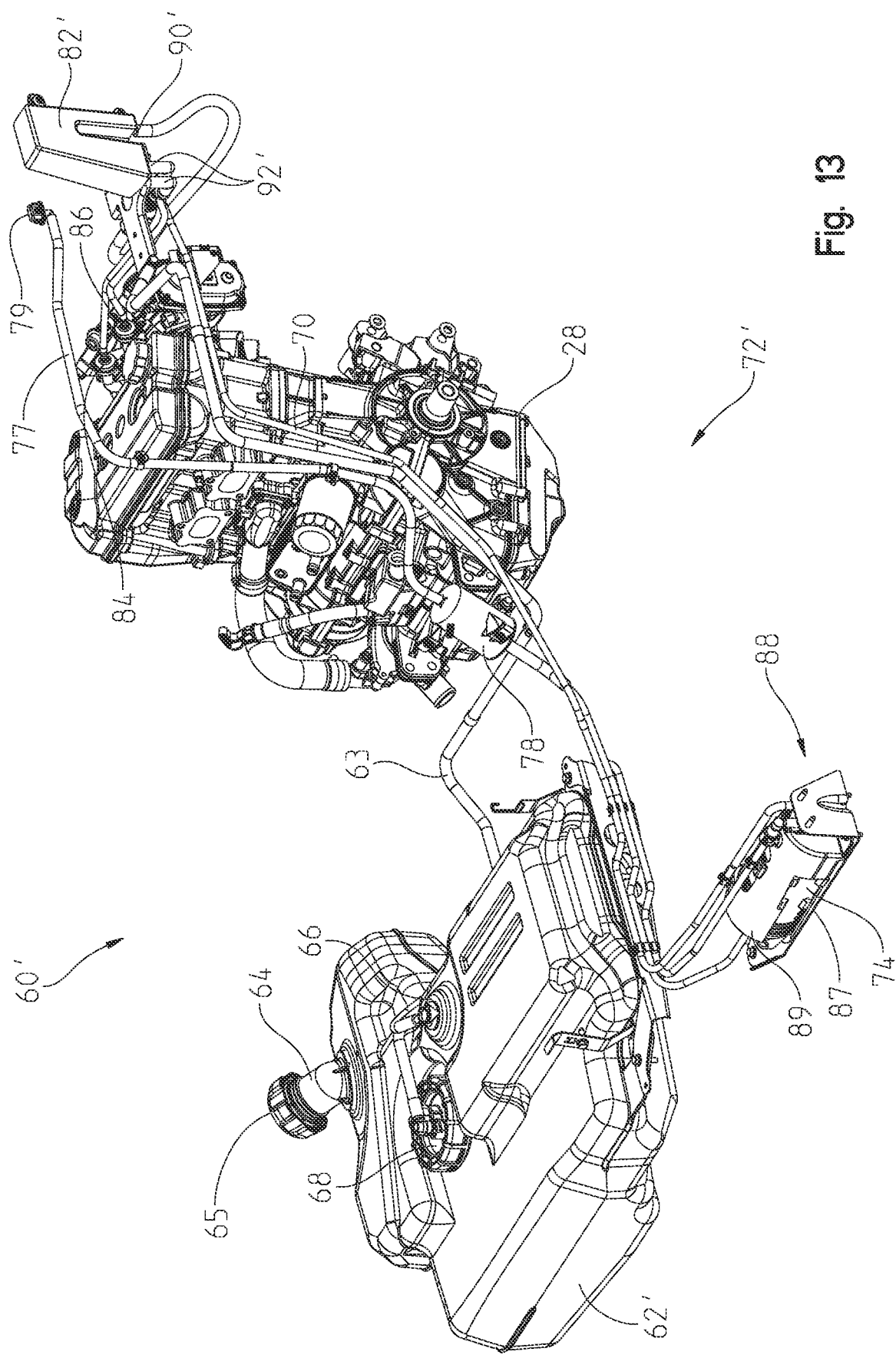
FIG. 13 shows a left front perspective view of the fuel system and the engine of FIG. 11.

Front and rear wheels 24, 26 of utility vehicle 20, 20' further support a frame assembly 48. Illustratively, frame assembly 48, 48' includes a lower frame assembly 47, 47' as well as an upper frame assembly 49, 49'. At least a portion of upper frame assembly 49 extends above an open-air operator area 50. Operator area 50 is supported on frame assembly 48 between front end 34 and rear end 44 and includes at least one seat 52 for an operator. In various embodiments, operator area 50 includes a single seat 52' for an operator (FIG. 1). In other various embodiments, a plurality of seats 52" are supported within the operator area 50 for the operator and passengers (FIG. 9). In some embodiments, seats 52" are arranged in a side-by-side configuration, as shown in FIGS. 9 and 12. Alternatively, seats 52" may be integrally coupled together to define a bench seat (not shown). Additionally, various embodiments of vehicle 20, 20' may include a cab assembly (not shown) to enclose at least a portion of operator area 50, for example a roof, a front windshield, a rear windshield, half doors, and/or full doors.

Still referring to FIGS. 1, 2, 9, and 10, operator area 50 also includes a plurality of controls and accessories. For example, operator area 50 includes steering controls, which may include a steering wheel 56 and an electric power steering unit. Additional controls include throttle controls, such as an accelerator pedal, a brake pedal, and a shift lever (not shown).

With reference now to FIGS. 3-8, utility vehicle 20 further includes a fuel system 60 fluidly coupled to engine 28 and generally supported by frame assembly 48. Fuel system 60 generally includes a fuel tank 62 fluidly coupled to engine 28 by a fuel delivery line 63.

Figure 2:
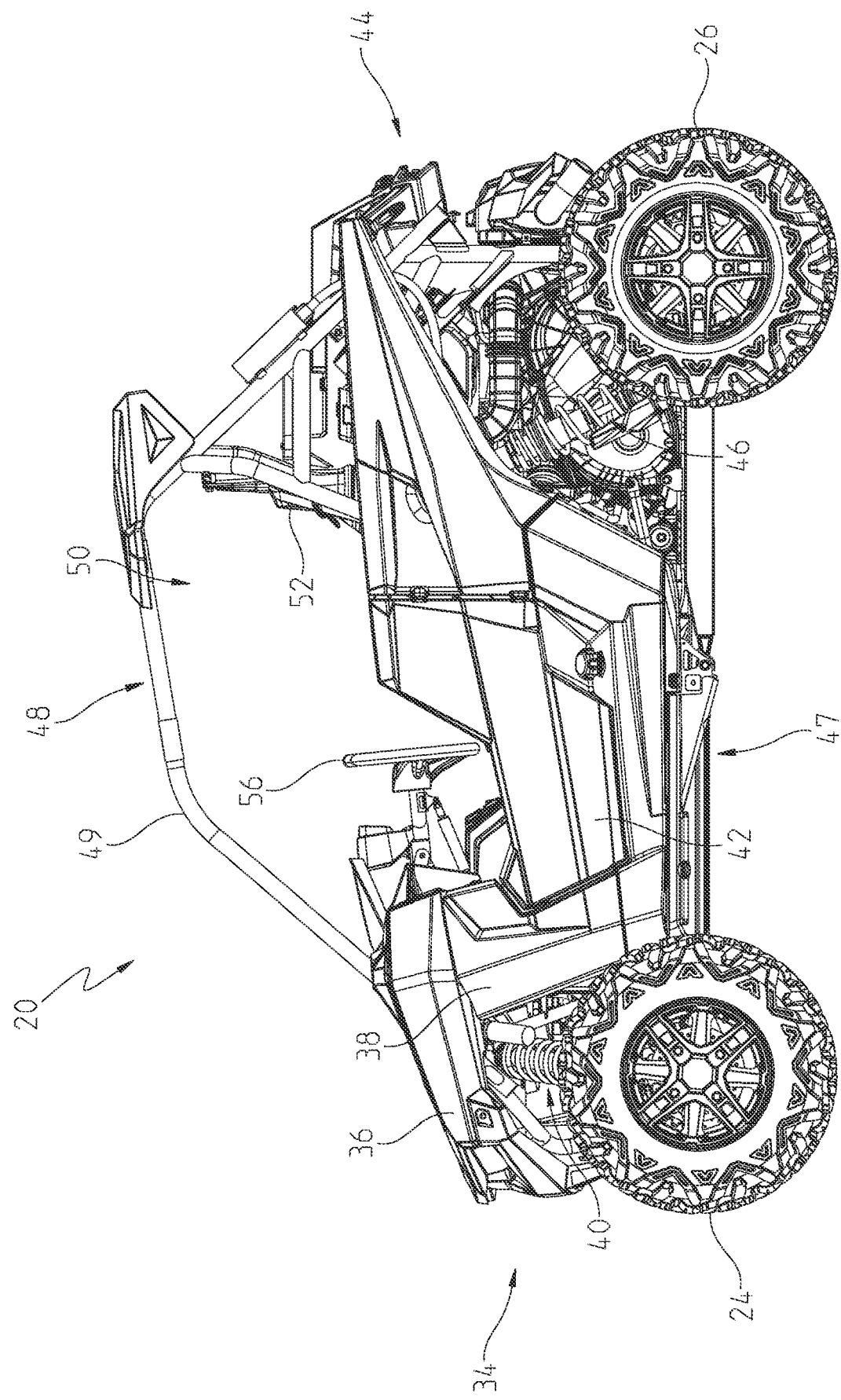
FIG. 2 shows a left side view of the vehicle of FIG. 1.
Figure 3:
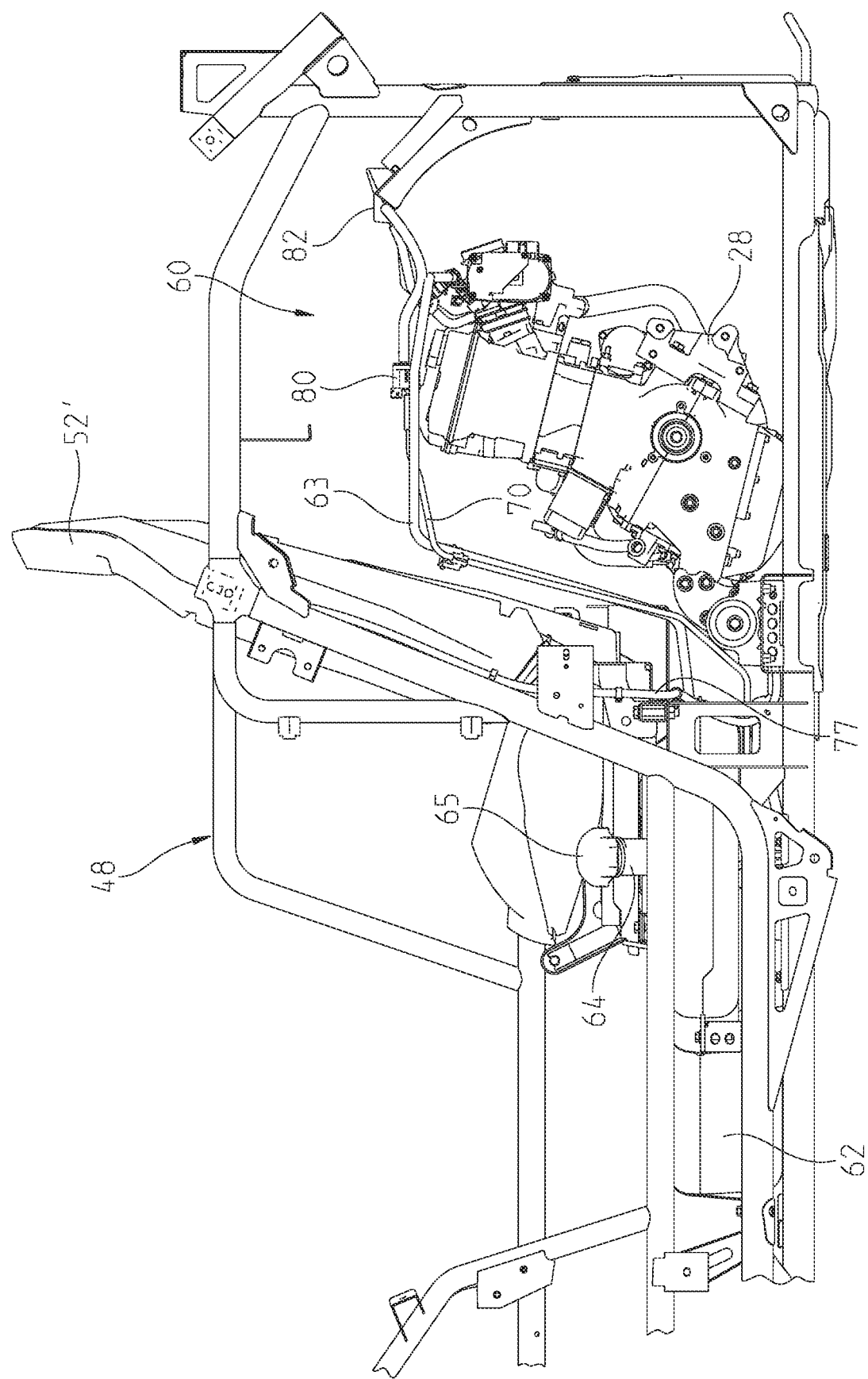
FIG. 3 shows left side view of an engine, a fuel system, a portion of a frame, and a seat of the vehicle of FIG. 1.

Fuel tank 62 includes a fill tube 64, a roll over valve 66, and a fuel pump 68, and is generally positioned below seat 52' (FIG. 1). Fill tube 64 of fuel tank 62 is configured to receive liquid fuel from a fuel delivery apparatus, and generally includes a cap 65 for containing both liquid fuel and fuel vapor within fuel tank 62. Furthermore, fill tube 64 is generally accessible from a side of vehicle 20. For instance, as shown in FIG. 2, fill tube 64 is positioned along the left side of vehicle 20. Roll over valve 66 of fuel tank 62 is configured to allow venting of fuel vapors collecting within fuel tank 62, and prevent liquid fuel from escaping fuel tank 62, specifically in the case of vehicle 20 overturning. Accordingly, roll over valve 66 prevents liquid fuel from entering a fuel vapor line 70 configured to receive fuel vapor from fuel tank 62 through roll over valve 66. Fuel pump 68 of fuel tank 62 is configured to deliver liquid fuel from fuel tank 62 to engine 28 through fuel delivery line 63 based on the operating conditions of vehicle 20, for example based on information received from the throttle controls.

Figure 6:
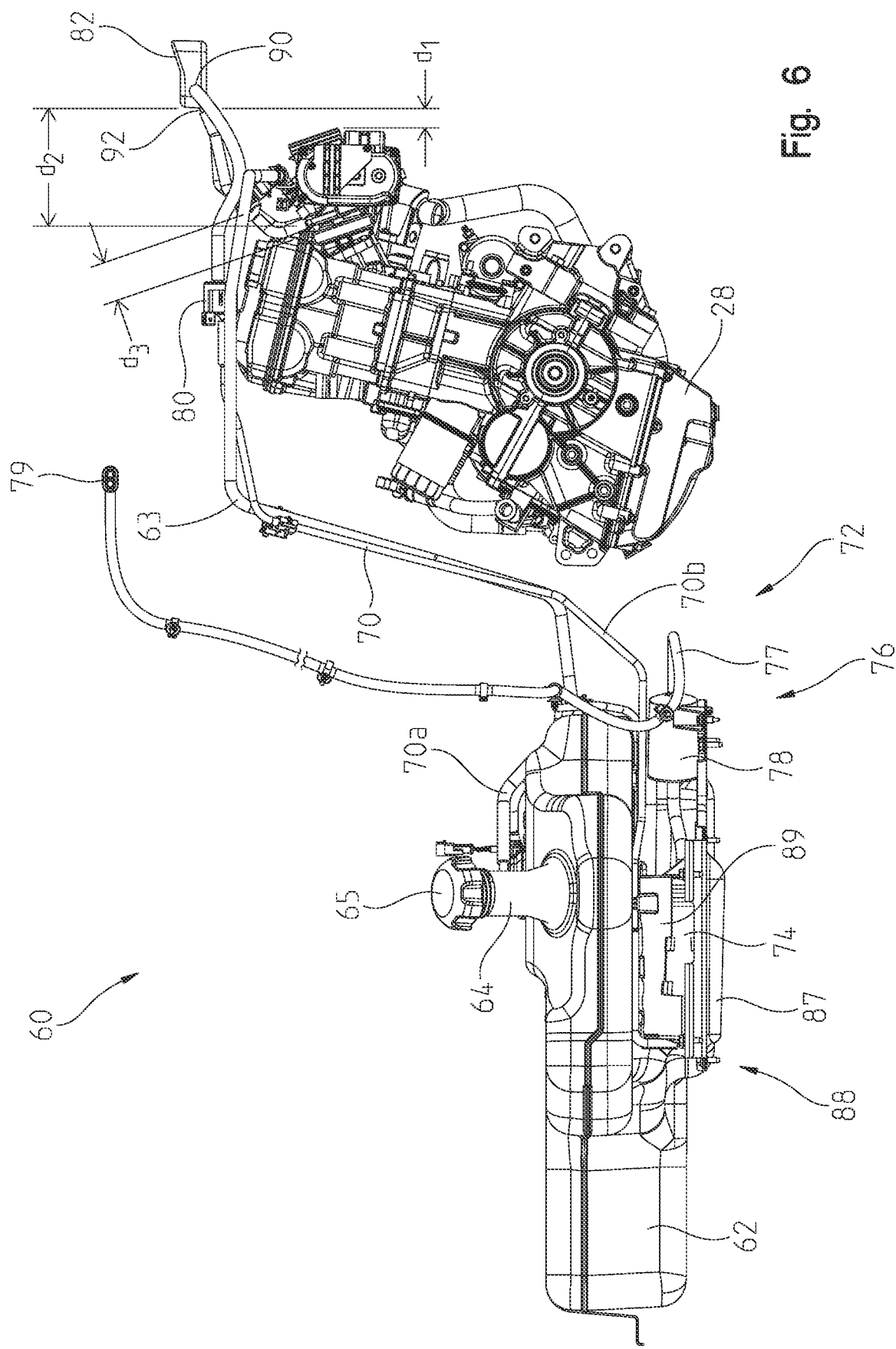
FIG. 6 shows a left side view of the fuel system and the engine of FIG. 3.
Figure 7:
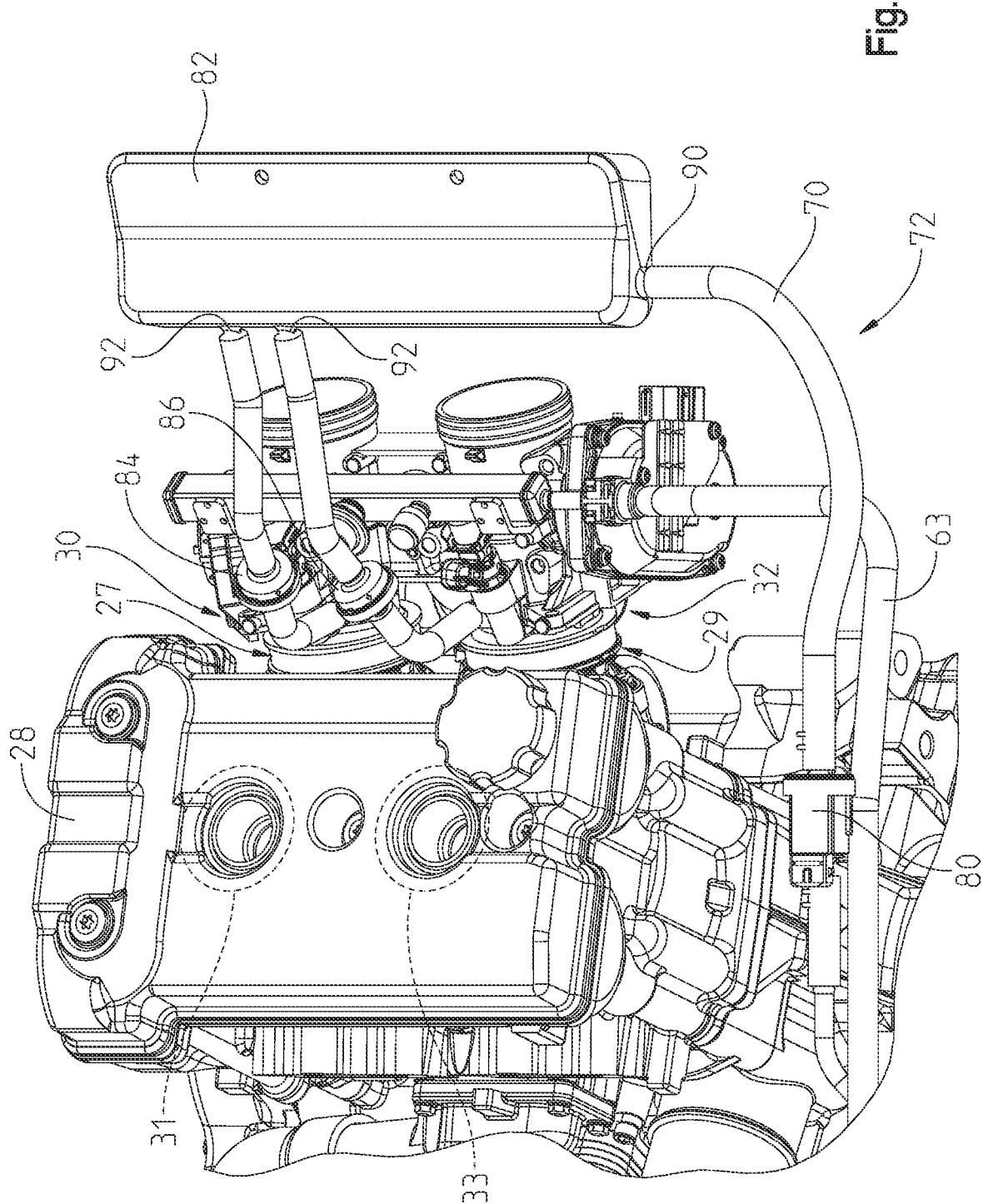
FIG. 7 shows a top perspective view of a portion of the engine and a portion of the fuel system of FIG. 3.
Figure 8:
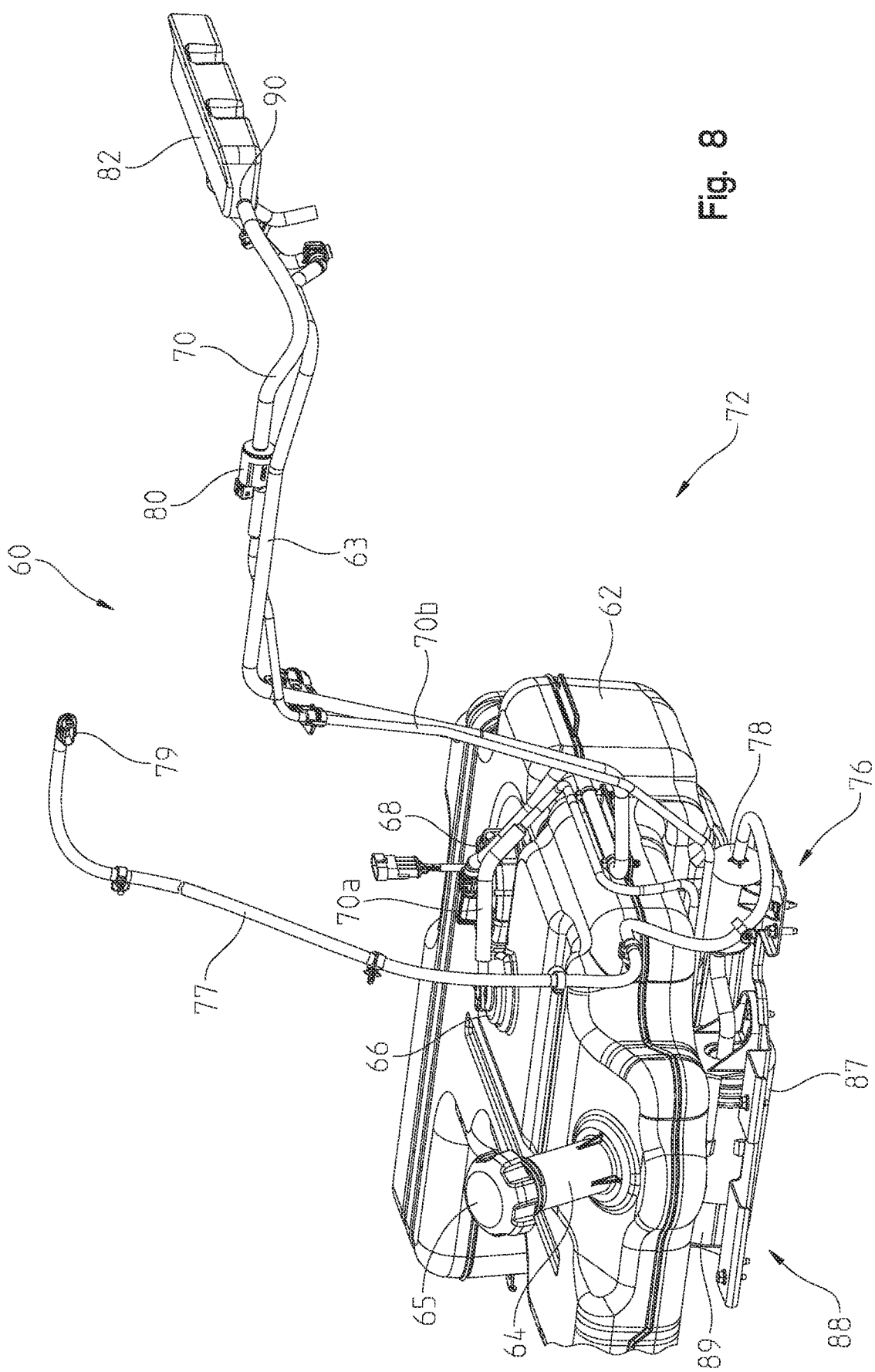
FIG. 8 shows a left rear perspective view of the fuel system of FIG. 3.

Still referring to FIGS. 3-8, fuel system 60 further includes an evaporative emissions control assembly 72. Evaporative emissions control assembly 72 includes fuel vapor line 70 fluidly coupling fuel tank 62 to engine 28, an evaporation canister 74 configured to receive and/or store fuel vapor received from fuel tank 62, a fresh air intake 76 coupled to evaporation canister 74 and configured to provide fresh ambient air for mixing with the fuel vapor within evaporation canister 74, an air filter 78 fluidly coupled to fresh air intake 76, a purge valve 80 positioned along fuel vapor line 70 and configured to control the amount of fuel vapor delivered to engine 28 from fuel tank 62 and/or evaporation canister 74, a mixing volume 82 configured to mix fuel vapor provided from fuel tank 62 and/or evaporation canister 74 with air, and at least one check valve 84, 86 configured to control the flow of fuel vapor and air into throttle bodies 30, 32 which are fluidly coupled to the cylinders of engine 28 from fuel vapor line 70. Illustratively, throttle body 30 is fluidly coupled to a first cylinder 31 of engine 28 through a first intake port 27 and throttle body 32 is fluidly coupled to a second cylinder 33 of engine 28 through a second intake port 29, as shown in FIG. 7. Each throttle body 30, 32 generally include a butterfly valve (not shown) which opens and closes based on a power input for engine 28. The movement of the butterfly valve determines the throttle position based on the degree the butterfly is opened or closed which increases or decreases, respectively, a flow of air (and fuel vapor) to cylinders 31, 33. In various embodiments, evaporative emissions control assembly 72 may include a single throttle body fluidly coupled to a fuel vapor line that is configured to be split and fluidly coupled to multiple intake ports and/or cylinders. Furthermore, in an alternative embodiment, throttle bodies 30, 32 (or the one throttle body) may be positioned upstream of an air volume configured for mixing fuel vapor with air.

Evaporative emissions control assembly 72 is configured such that fuel vapor from fuel tank 62 travels through roll over valve 66 and fuel vapor line 70 to evaporation canister 74. Evaporation canister 74 adsorbs and stores the fuel vapors from tank 62 until purge valve 80 is opened allowing fuel vapors and air to travel through fuel vapor line 70 and purge valve 80 and into mixing volume 82. Evaporation canister 74 is also coupled to fresh air intake 76 through air intake line 77 such that ambient air is pulled into evaporation canister 74 through air filter 78, positioned along air intake line 77, to mix with the fuel vapors within evaporation canister 74 when purge valve 80 is opened. Air intake line 77 has a fitting 79 at an intake end coupled to a frame tube of frame assembly 48 to prevent spiders or debris from entering air intake line 77.

Figure 4:
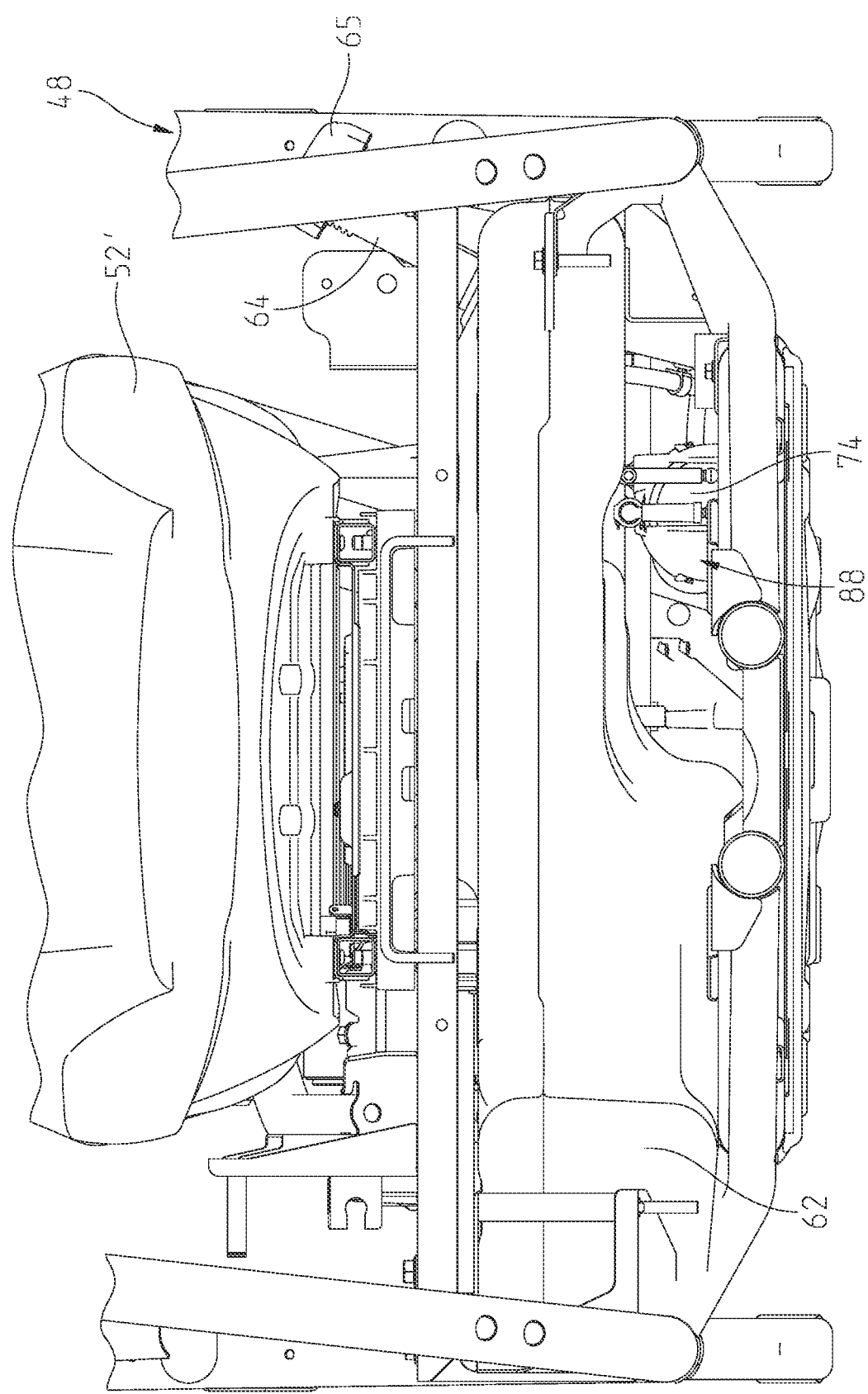
FIG. 4 shows a front view of the fuel system, the seat, and the portion of the frame of the vehicle in FIG. 3.
Figure 5:
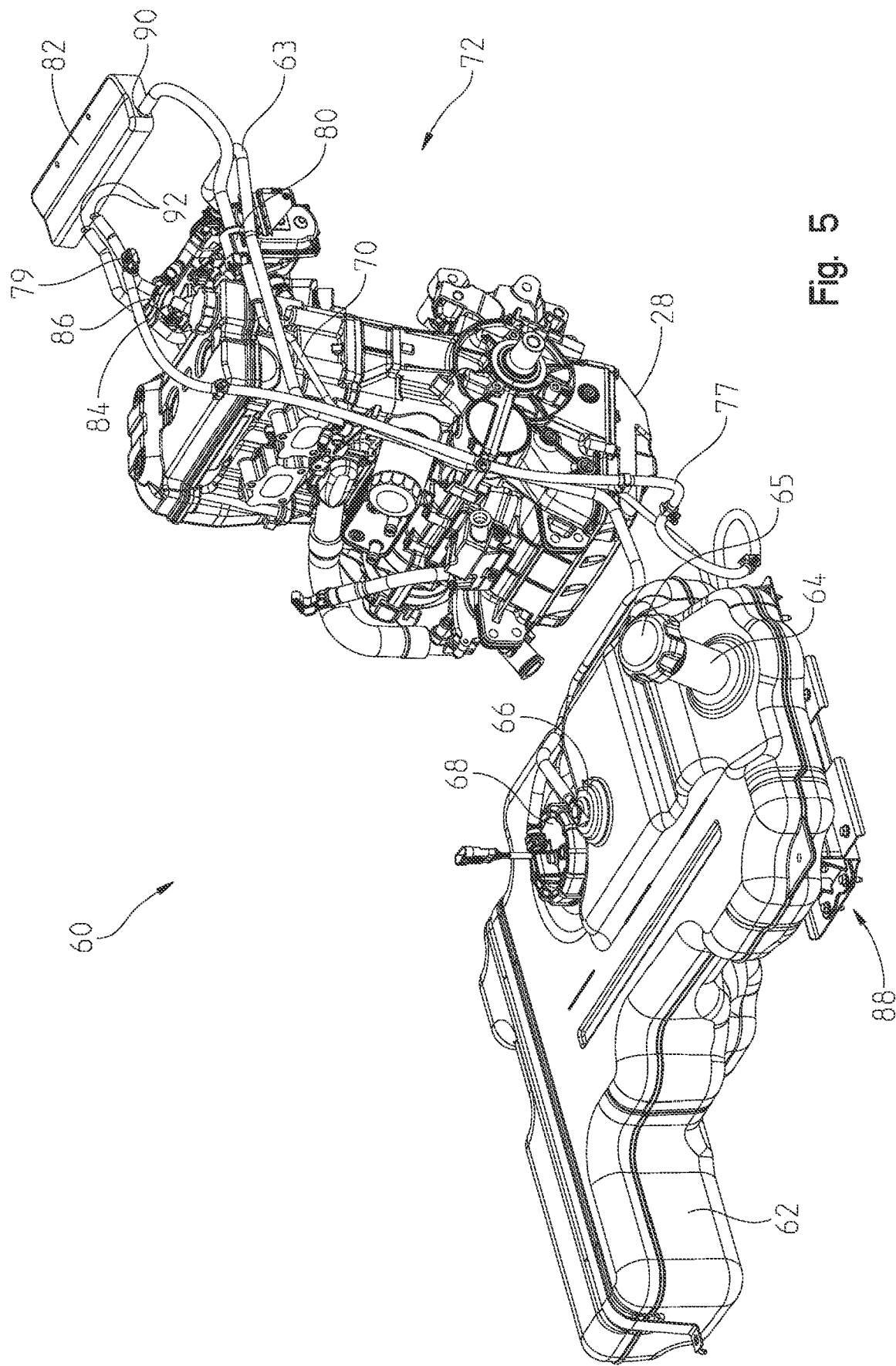
FIG. 5 shows a left front perspective view of the fuel system and the engine of FIG. 3.

Furthermore, as shown in FIGS. 3-8, evaporation canister 74 is generally positioned in close proximity to fuel tank 62. For instance, as shown in FIG. 4, canister 74 may be positioned below fuel tank 62. In other various embodiments, evaporation canister 74 may be positioned forward, rearward, above, or to the side of evaporation canister 74. In addition, evaporation canister 74 is generally coupled to frame assembly 48 of vehicle 20 using a bracket 88. Bracket 88 is coupled to frame tubes and/or a chassis bracket (not shown) of frame assembly 48, and generally includes a bottom bracket portion 87 configured to couple to frame assembly 48, and a cover portion 89 configured to support canister 74 on bottom bracket portion 87. In various embodiments, bracket 88 may also include a dampening material positioned between canister 74 and bottom bracket portion 87 and/or cover portion 89. The dampening material is configured to absorb shock or loads experienced by bracket 88 to prevent transferring such shocks and loads to canister 74. The dampening material may include, for example, foam or rubber.

In various embodiments, evaporative emissions control assembly 72 may include a plurality of canisters 74, with canisters 74 being coupled in series. When canisters 74 are coupled in series, a first canister includes an intake port fluidly coupled to fuel tank 62 to receive fuel vapors, an outlet port fluidly coupled to engine 28, and a port fluidly coupled to a second canister, and a second canister includes a fresh air intake port fluidly coupled to fresh air intake 76, and a port fluidly coupled to the first canister. If more than two canisters are coupled in series, an additional canister positioned between the first canister and the second canister includes two ports, one coupled to each adjoining canister. In various embodiments, each canister in series may be the same size, while in other various embodiments, at least one of the canisters in series may be a different size from the other canisters. More particularly, canister 74 may be of varying sizes because the size of canister 74 correlates to available vapor space in the fuel tank of the vehicle such that larger fuel tanks may include larger canisters 74 while smaller fuel tanks may be used with smaller canisters 74. For smaller canisters, the canister may be positioned closer to the engine, which enhances purge flow and allows for longer periods of time between purges.

Purging of fuel vapors within canister 74 or fuel system 60 is traditionally done by pulling on a vacuum on a portion of fuel system 60 to flow the fuel vapor in a particular direction. For example, engine 28 may be configured to pull the fuel vapors and air within fuel system 60 and/or evaporative emission control assembly 72 toward engine 28. However, purge valve 80 can be provided along fuel vapor line 70 to control the rate of purging of the fuel vapors through fuel system 60 more precisely. In other words, purge valve 80 can be on, off, or at any position in between, such that engine 28 and/or user of vehicle 20, 20' may control the rate of purge flow.

For instance, in various embodiments, purge valve 80 is configured to open for a predetermined period of time and be closed for a predetermined period of time. In general, the predetermined open and closed periods of time may be substantially uniform in length. For instance, in some embodiments, the open and closed periods of time are both approximately 90 seconds. In other various embodiments, the opening and closing of purge valve 80 is controlled based on engine parameters such that the open and closed periods of time may be greater or less than 125 seconds and/or may vary with each other. For example, purge valve open and closed times can be determined based on at least one of engine intake air temperature (atmospheric), engine load, engine speed, throttle position, coolant temperature, time period at idle, amount of purge volume that has flowed since engine ignition, purge vapor concentration within fuel vapor line 70, etc. In various embodiments, the time period at idle may be a period of time where the rpm of engine 28 is in a certain range for a certain duration, i.e., below or at clutch engagement or below or at approximately 1800 rpm, or more specifically, between 1100-1800 rpm, for an extended period of time. Furthermore, in general, the purge rate may slowly increase after engine ignition for engine stability so the engine can learn the purging rate, frequency, vapor concentration before purging, etc. In one embodiment, the cycle of purge valve 80 is configured to align with the frequency of the intake strokes of engine 28 at different RPM values. In various embodiments, the cycle time of purge valve 80 may be greater or less than 175 seconds, for example, in one embodiment, the cycle time of purge valve 80 may be approximately 50-125 second and may further by approximately 90 seconds.

Referring to FIGS. 3-8, purge valve 80 of fuel system 60 is generally coupled along fuel vapor line 70 between fuel tank 62 and mixing volume 82 or engine 28 and may be positioned a predetermined distance from engine 28 and/or mixing volume 82. In one embodiment, purge valve 80 may be positioned less than 500 millimeters from mixing volume 82. In the embodiment shown in FIG. 6, purge valve 80 is approximately 200 millimeters from mixing volume 82. In various embodiments, purge valve 80 is positioned behind seat 52 and vertically higher than engine 28 at a position between a left side of engine 28 and a left side of frame assembly 48.

Figure 14:
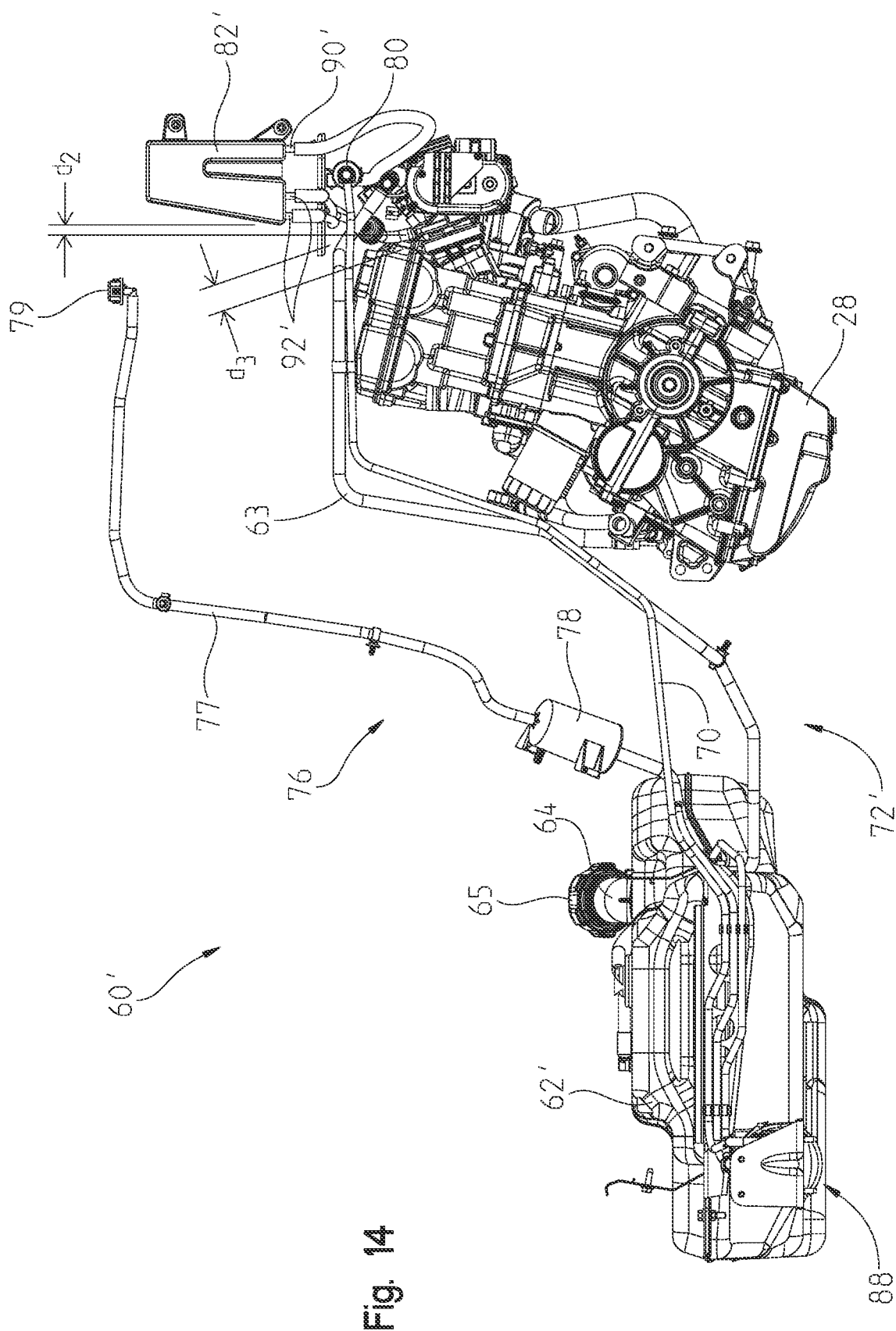
FIG. 14 shows a left side view of the fuel system and the engine of FIG. 11.

Still referring to FIGS. 3-8, mixing volume 82 can be provided along fuel vapor line 70 to improve the mixture of the fuel vapors and air being pulled into engine 28 and can act to decouple the purge valve frequency from the engine firing frequency. Mixing volume 82 generally comprises an inlet 90 and at least one outlet 92 which are configured to be fluidly coupled to the first and second cylinders 31, 33 through intake ports 27, 29. Illustratively, mixing volume 82 includes two outlets 92, which are fluidly coupled to intake ports 27, 29 through throttle bodies 30, 32 of engine 28. In various embodiments, mixing volume 82 may be coupled to throttle bodies 30, 32 upstream or downstream of the butterfly valve of throttle bodies 30, 32. In addition, in various embodiments, mixing volume 82 may further include a baffle 94 within an interior of mixing volume 82 to further improve the mixing of the fuel vapors and air. Inlet 90 and outlet(s) 92 may be positioned about two different sides of mixing volume 82, as shown in FIG. 7, or about the same side surface of mixing volume 82', as shown in FIG. 14. When inlet 90 and outlets 92 are on the same side surface of mixing volume 82', inlet 90' is positioned on one side of baffle 94 and outlets 92' are positioned on the other side of baffle 94 such that a flow path of mixed fuel vapor and air is arcuate between inlet 90' and outlet 92' allowing for improved mixture of the fuel vapor and air and preventing the outlet 92' closer to inlet 90' from receiving a majority of the fuel vapor causing one of the cylinders to run poorly. More particularly, the arcuate flow path defined by baffle 94 allows the air and fuel vapor to remain within mixing volume 82' longer, thereby allowing for more mixing of the fuel vapor and air prior to expelling the mixture of air and fuel volume into throttle bodies 30, 32.

Mixing volume 82 is generally positioned in close proximity to purge valve 80 near engine 28. In addition, mixing volume 82 is generally positioned upstream of an outlet of throttle bodies 30, 32. Mixing volume 82 is generally positioned as close to intake ports 27, 29 of engine 28 as possible to provide the best advantage to evaporative emissions. For instance, the closer throttle bodies 30, 32 are to mixing volume 82, the better the mixture of fuel vapors and air being delivered to the cylinder of engine 28. Furthermore, mixing volume 82 is generally coupled to engine 28 and fuel tank 62 or evaporation canister 74 through fuel vapor line 70. In various embodiments, mixing volume 82 is fluidly coupled to engine 28 through at least one throttle body 30, 32 coupled to each cylinder of engine 28. In addition, mixing volume 82 is generally positioned rearward of seat 52'. In various embodiments, mixing volume 82 is also positioned directly rearward of engine 28. The distance $d_1$, shown in FIG. 6, represents the distance between a forward surface of mixing volume 82 and a rearward surface of engine 28. In various embodiments, di may be approximately 5-100 millimeters, and more specifically 10-25 millimeters. In the embodiment shown in FIG. 6, di is approximately 22.50 millimeters. Furthermore, the distance $d_2$, shown in FIG. 6, represents the distance between mixing volume 82 and throttle bodies 30, 32 of engine 28. In various embodiments, $d_2$ may be approximately 5-250 millimeters, and more specifically approximately 5-140 millimeters. For instance, in the embodiment shown in FIG. 6, $d_2$ is approximately 130.50 millimeters, while in the embodiment shown in FIG. 14, $d_2$ is approximately 10 millimeters. In various embodiments, mixing volume 82 may also be positioned vertically higher than a cylinder head or an uppermost surface of engine 28. This positioning of mixing volume 82 at a vertical distance greater than an upper portion of engine 28 allows any fuel which has condensed to liquid fuel in mixing volume 82 to naturally flow in a generally downward direction toward intake ports 27, 29 of engine 28. Additionally, baffle 94 also may promote proper flow of any condensed fuel within mixing volume 82 by directing liquid fuel toward a particular area of mixing volume 82, which has the further benefit of decreasing the likelihood that the liquid fuel therein would block inlet or outlet 90, 92.

Check valves 84, 86 may be provided along fuel vapor line 70 to eliminate or inhibit cross talk or fluid communication between cylinders 31, 33 of engine 28. Thus, when purge valve 80 is opened, and the vacuum of engine 28 is pulling fuel vapors and air through fuel vapor line 70 of fuel system 60, each cylinder is only pulling from their respective line instead of drawing fuel and air toward or away from the other cylinders. In general, check valve 84, 86 are positioned within a distance $d_3$ of intake ports 27, 29 of engine 28. In one embodiment, distance $d_3$ may be less than 150 millimeters. More specifically, $d_3$ is generally between 25-75 millimeters. For instance, in the embodiment shown in FIG. 6, $d_3$ is approximately 33.50 millimeters, while in the embodiment shown in FIG. 14, $d_3$ is approximately 48 millimeters. The proximity of check valves 84, 86 to intake ports 27, 29 allows the operation of check valves 84, 86 to have less effect on the operation of engine 28. Furthermore, at least a portion of check valves 84, 86 generally overlaps, in a vertical direction, with at least a portion of intake ports 27, 29 of engine 28 when viewed from above. More specifically, at least a portion of check valves 84, 86 are positioned within a vertical envelope of engine 28 because check valves 84, 86 are at least partially in the same location of intake ports 27, 29.

In operation, fuel system 60 of FIGS. 1-8 operates by providing fuel from fuel tank 62 to engine 28 via fuel delivery line 63. While fuel is in fuel tank 62, fuel vapor may be present, however, the emission of fuel vapor from vehicle 20 may be regulated by emissions regulations. As such, it is necessary to contain the fuel vapor within fuel system 60 according to these emissions regulations. Therefore, vehicle 20 includes evaporative emissions control assembly 72 to control emission of the fuel vapor from vehicle 20. More particularly, as fuel vapor is formed, the fuel vapor flows into evaporation canister 74 from valve 66 through a first portion 70a of fuel vapor line 70. Evaporation canister 74 may be configured to store the fuel vapor until a certain volume or other quantity of hydrocarbons of fuel vapor has accumulated therein, until a certain engine condition has occurred, and/or until a predetermined time has passed before releasing the fuel vapor therein. Alternatively, evaporation canister 74 may be configured to continuously receive and emit fuel vapor therefrom for a continuous flow of fuel vapor through evaporation canister 74.

When a predetermined engine condition has occurred, time has passed, or quantity of fuel vapor has accumulated, purge valve 80 may cooperate with air intake 76 and evaporation canister 74 to provide ambient air to evaporation canister 74 to mix with the fuel vapor therein and to draw the mixture of air and fuel vapor from evaporation canister 74 toward mixing volume 82 through a second portion 70b of fuel vapor line 70. Once at mixing volume 82, the air and fuel vapor continue to further mix together and then flow into throttle bodies 30, 32 through outlets 92. In this way, once the mixture of fuel vapor and air is provided to throttle bodies 30, 32, this mixture enters the cylinders of engine 28 and may be mixed with fuel from fuel delivery line 63 for combustion therein. Therefore, fuel system 60 is configured to capture fuel vapor therein and provide the fuel vapor to engine 28 where it is consumed during the combustion process rather than emitting the fuel vapor to the atmosphere.

An alternative embodiment of fuel system 60 is shown as fuel system 60' in FIGS. 11-19. Fuel system 60' is fluidly coupled to engine 28 and generally supported by frame assembly 48' similarly to fuel system 60. Fuel system 60' also generally includes fuel tank 62' fluidly coupled to engine 28 by fuel delivery line 63, and evaporative emissions control assembly 72'. Evaporative emission control assembly 72' generally includes fuel vapor line 70 fluidly coupling fuel tank 62' to engine 28, evaporation canister 74 configured to receive and/or store fuel vapor received from fuel tank 62', fresh air intake 76 coupled to evaporation canister 74 and configured to provide fresh ambient air for mixing with the fuel vapor within evaporation canister 74, air filter 78 fluidly coupled to air intake line 77, purge valve 80 positioned along fuel vapor line 70 and configured to control the amount of fuel vapor delivered to engine 28 from fuel tank 62' and/or evaporation canister 74, mixing volume 82' configured to mix fuel vapor provided from fuel tank 62' and/or evaporation canister 74 with air, and at least one check valve 84, 86 configured to control the flow of fuel vapor and air into throttle bodies 30, 32 which are fluidly coupled to the cylinders of engine 28 from fuel vapor line 70. Evaporative emission control assembly 72' is substantially similar to evaporative emission control assembly 72 but for the positioning of the elements and an alternative embodiment of mixing volume 82.

Figure 19:
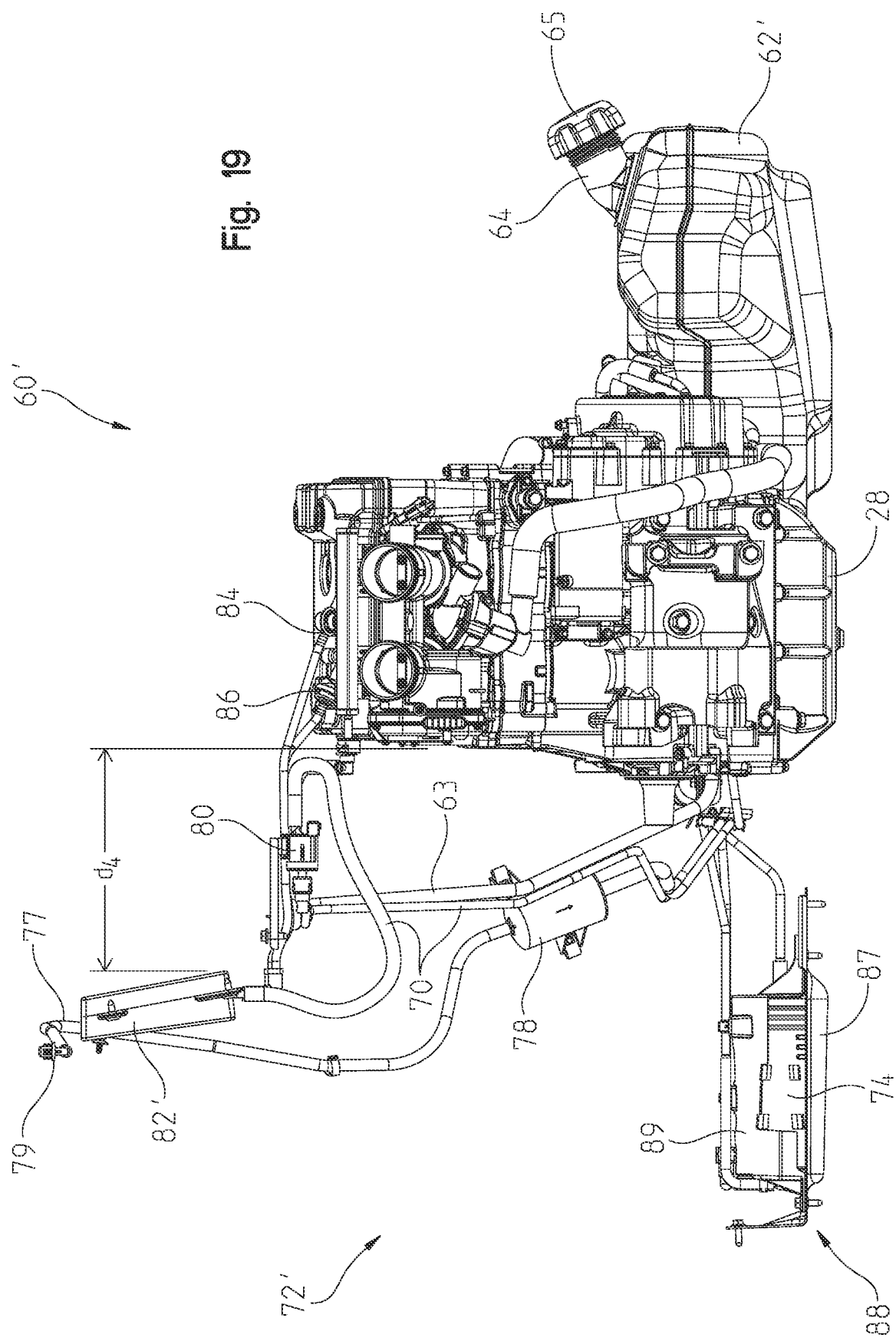
FIG. 19 shows a rear view of the engine and the fuel system of FIG. 11.

For instance, as shown in FIGS. 11-19, evaporation canister 74 is not positioned below fuel tank 62', but instead, is positioned to a side of fuel tank 62' and below one of two seats 52". In addition, air filter 78 is positioned between fuel tank 62' and engine 28 and behind seat 52" rather than underneath seat 52' and fuel tank 62, as shown in FIG. 6. Furthermore, mixing volume 82' is laterally spaced apart from the cylinder head of engine 28 or positioned to a side of engine 28 rather than behind engine 28. More specifically, mixing volume 82' is positioned a distance, $d_4$ to the side of engine 28, as shown in FIG. 19. Generally, $d_4$ is less than 300 millimeters. For instance, $d_4$ of mixing volume 82', shown in FIG. 19, is approximately 226 millimeters. Additionally, mixing volume 82' includes inlet 90' and outlets 92' positioned on the same side surface of mixing volume 82' and baffle 94 positioned between inlet 90' and outlets 92' for directing the flow of fuel vapors in an arcuate direction from inlet 90' to outlets 92'. In addition, purge valve 80 is positioned behind engine 28 rather than to the side of engine 28.

In various embodiments, at least one alignment member or assembly guide may be used to provide guidance and assistance in the assembly of fuel system 60, 60' to engine 28 and other components of vehicles 20, 20'.

In operation, fuel system 60' of FIGS. 9-19 operates by providing fuel from fuel tank 62' to engine 28 via fuel delivery line 63. While fuel is in fuel tank 62', fuel vapor may be present, however, the emission of fuel vapor from vehicle 20' may be regulated by emissions regulations. As such, it is necessary to contain the fuel vapor within fuel system 60' according to these emissions regulations. Therefore, vehicle 20' includes evaporative emissions control assembly 72' to control emission of the fuel vapor from vehicle 20'. More particularly, as fuel vapor is formed, the fuel vapor flows through a first portion 70a of fuel vapor line 70 into evaporation canister 74 from valve 66. Evaporation canister 74 may be configured to store the fuel vapor until a certain volume or other quantity of hydrocarbons of fuel vapor has accumulated therein, until a certain engine condition has occurred, and/or until a predetermined time has passed before releasing the fuel vapor therein. Alternatively, evaporation canister 74 may be configured to continuously receive and emit fuel vapor therefrom for a continuous flow of fuel vapor through evaporation canister 74.

When a predetermined engine condition has occurred, time has passed, or quantity of fuel vapor has accumulated, purge valve 80 may cooperate with air intake 76 and evaporation canister 74 to provide ambient air to evaporation canister 74 to mix with the fuel vapor therein and to draw the mixture of air and fuel vapor from evaporation canister 74 toward mixing volume 82' through a second portion of fuel vapor line 70. Once at mixing volume 82', the air and fuel vapor continue to further mix together and then flow into throttle bodies 30, 32 through outlets 92'. In this way, once the mixture of fuel vapor and air is provided to throttle bodies 30, 32, this mixture enters the cylinders of engine 28 and may be mixed with fuel from fuel delivery line 63 for combustion therein. Therefore, fuel system 60' is configured to capture fuel vapor therein and provide the fuel vapor to engine 28 where it is consumed during the combustion process rather than emitting the fuel vapor to the atmosphere.

Additional details of vehicle 2 and/or the powertrain assembly may be disclosed in U.S. Patent Application Ser. No. 62/438,267; U.S. patent application Ser. No. 15/388, 221; U.S. patent application Ser. No. 15/388,436; U.S. patent application Ser. No. 15/388,106; and U.S. patent application Ser. No. 15/389,147, the complete disclosures of which are expressly incorporated by reference herein.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:
1. A vehicle comprising:
a frame;
a plurality of ground engaging members supporting the frame;
a powertrain assembly operably coupled to the ground engaging members, the powertrain assembly comprising:

an engine having a first cylinder and a second cylinder; and
at least one throttle body fluidly coupled to the first cylinder and the second cylinder;
an intake assembly coupled to the engine, the intake assembly comprising a first intake port and a second intake port;
an exhaust assembly coupled to the engine; and
a fuel system fluidly coupled to the engine, the fuel system including;
a first throttle body fluidly coupled to the first intake port,
a second throttle body fluidly coupled to the second intake port,
a mixing volume fluidly coupled to each of the first throttle body and the second throttle body,
a fuel tank, and the mixing volume and the fuel tank each fluidly coupled to each of the first throttle body and the second throttle body,
an evaporative canister fluidly coupled intermediate the fuel tank and the mixing volume
a first check valve operably coupled to the first cylinder and positioned intermediate the mixing volume and the first throttle body,
a second check valve operably coupled to the second cylinder and positioned intermediate the mixing volume and the second throttle body, and
a fuel vapor line fluidly coupling the fuel tank to the first check valve and the second check valve.

2. The vehicle of claim 1, wherein the first and second check valves are positioned within approximately 150 millimeters of the first and second cylinders.

3. The vehicle of claim 1, wherein the fuel system further includes a purge valve, the purge valve being positioned downstream of the fuel tank and upstream of the mixing volume and the mixing volume being positioned downstream of the fuel tank and the purge valve and upstream of the first and second check valves.

4. The vehicle of claim 1, wherein the first and second check valves inhibit fluid communication between the first cylinder and the second cylinder.

5. The vehicle of claim 1, further comprising a seat supported by the frame, the seat configured to support an operator, and each of the first check valve and the second check valve are positioned rearward of the seat.

6. The vehicle of claim 1, wherein the mixing volume is positioned vertically higher than the first intake port.

7. The vehicle of claim 1, wherein the fuel tank is positioned longitudinally forward of the mixing volume.

8. The vehicle of claim 1, further comprising a purge valve positioned intermediate the evaporative canister and the mixing volume.

9. The vehicle of claim 1, wherein the first check valve is positioned less than 150 millimeters from the first intake port.

10. The vehicle of claim 9, wherein the first check valve is positioned between 25-75 millimeters from the first intake port.

11. A vehicle comprising:
a frame;
a plurality of ground engaging members supporting the frame;
an operator area including at least one seat supported by the frame;
a powertrain assembly operably coupled to the ground engaging members, the powertrain assembly comprising an engine positioned generally rearward of the at least one seat, and an intake assembly coupled to the engine, the intake assembly comprising a first intake port and a second intake port; and
a fuel system fluidly coupled to the engine, the fuel system including:
a fuel tank positioned below the at least one seat and fluidly coupled to the intake assembly through a fuel delivery line,
a mixing volume fluidly coupled to the engine,
a fuel vapor line fluidly coupling the fuel tank to the mixing volume,
an evaporation canister positioned fluidly along the fuel vapor line,
a first check valve positioned fluidly intermediate the evaporation canister and the first intake port, and
a second check valve positioned fluidly intermediate the evaporation canister and the second intake port,
wherein mixing volume, the first check valve, and the second check valve are positioned rearward of the at least one seat.

12. The vehicle of claim 11, wherein the evaporation canister is positioned under the fuel tank.

13. The vehicle of claim 11, wherein the at least one seat includes a first seat and a second seat in side-by-side arrangement with the first seat, and the evaporation canister is positioned under the second seat and the fuel tank is positioned under the first seat.

14. The vehicle of claim 11, wherein the mixing volume is positioned vertically higher than an uppermost surface of the engine.

15. The vehicle of claim 11, wherein the mixing volume comprises an inlet fluidly coupled to the evaporative canister, a first outlet fluidly coupled to the first intake port and a second outlet fluidly coupled to the second intake port.

16. The vehicle of claim 15, wherein the first check valve is positioned intermediate the mixing volume and the first intake port, and the second check valve is positioned intermediate the mixing volume and the second intake port.

17. The vehicle of claim 11, wherein the first check valve is positioned less than 150 millimeters from the first intake port.

18. The vehicle of claim 17, wherein the first check valve is positioned between 25-75 millimeters from the first intake port.

19. The vehicle of claim 11, wherein at least a portion of the first check valve overlaps, in a vertical direction, at least a portion of the first intake port.

20. The vehicle of claim 11, wherein a portion of the first check valve is positioned within a vertical envelope of the engine.

21. The vehicle of claim 11, further comprising a mixing volume positioned intermediately the evaporative canister and the first check valve, and the mixing volume is positioned vertically higher than the fuel tank.

* * * * *